US011204998B2

(12) United States Patent
Lancioni et al.

(10) Patent No.: US 11,204,998 B2
(45) Date of Patent: Dec. 21, 2021

(54) DETECTION AND MITIGATION OF FILELESS SECURITY THREATS

(71) Applicant: McAfee, LLC, Plano, TX (US)

(72) Inventors: German Lancioni, San Jose, CA (US); Cedric Cochin, Portland, OR (US); Kunal Mehta, Hillsboro, OR (US)

(73) Assignee: McAfee, LLC, Plano, TX (US)

( * ) Notice: Subject to any disclaimer, the term of this patent is extended or adjusted under 35 U.S.C. 154(b) by 465 days.

(21) Appl. No.: 16/056,828

(22) Filed: Aug. 7, 2018

(65) Prior Publication Data
US 2020/0050761 A1  Feb. 13, 2020

(51) Int. Cl.
*G06F 21/00* (2013.01)
*G06F 21/56* (2013.01)
*G06F 21/55* (2013.01)
*G06N 7/00* (2006.01)
*H04L 29/06* (2006.01)
*G06N 5/04* (2006.01)

(52) U.S. Cl.
CPC .......... *G06F 21/565* (2013.01); *G06F 21/554* (2013.01); *G06F 21/563* (2013.01); *G06F 21/566* (2013.01); *G06N 5/04* (2013.01); *G06N 7/005* (2013.01); *H04L 63/1416* (2013.01); *H04L 63/1441* (2013.01)

(58) Field of Classification Search
None
See application file for complete search history.

(56) References Cited

U.S. PATENT DOCUMENTS

| | | | |
|---|---|---|---|
| 8,762,298 B1 * | 6/2014 | Ranjan | G06F 21/552 706/12 |
| 10,521,587 B1 * | 12/2019 | Agranonik | G06N 3/0445 |
| 10,581,888 B1 * | 3/2020 | Agranonik | H04L 63/1466 |
| 2005/0022018 A1 * | 1/2005 | Szor | H04L 63/145 726/4 |
| 2017/0220800 A1 * | 8/2017 | Niemela | H04L 63/1433 |
| 2018/0300480 A1 * | 10/2018 | Sawhney | G06F 21/563 |
| 2019/0026466 A1 * | 1/2019 | Krasser | G06F 21/565 |
| 2019/0121978 A1 * | 4/2019 | Kraemer | G06F 21/566 |
| 2019/0215329 A1 * | 7/2019 | Levy | G06N 20/00 |
| 2019/0236273 A1 * | 8/2019 | Saxe | G06F 21/56 |
| 2019/0306184 A1 * | 10/2019 | Oliner | G06N 3/08 |
| 2020/0050761 A1 * | 2/2020 | Lancioni | G06F 21/554 |
| 2020/0285741 A1 * | 9/2020 | Kashyap | G06F 21/56 |

OTHER PUBLICATIONS

Candid Wueest, Himanshu Anand, "Living off the land and fileless attack techniques—An ISTR Special Report", Symantec, Jul. 2017, p. 1-30. (Year: 2017).*

* cited by examiner

*Primary Examiner* — Jeffery L Williams
(74) *Attorney, Agent, or Firm* — Patent Capital Group

(57) ABSTRACT

There is disclosed in one example a computing apparatus, including: a hardware platform; and a storage medium having stored thereon executable instructions to provide an inference engine configured to: receive a new suspicious fragment object from a protected device; add the new suspicious fragment object to a rolling map configured to provide a temporal snapshot of suspicious fragment objects over a time span; determine a connection between the new suspicious fragment object and an existing suspicious fragment object within the rolling map; apply the connection to a connection map; and operate a map classifier to determine that the connection map represents a probable computer security threat.

18 Claims, 10 Drawing Sheets

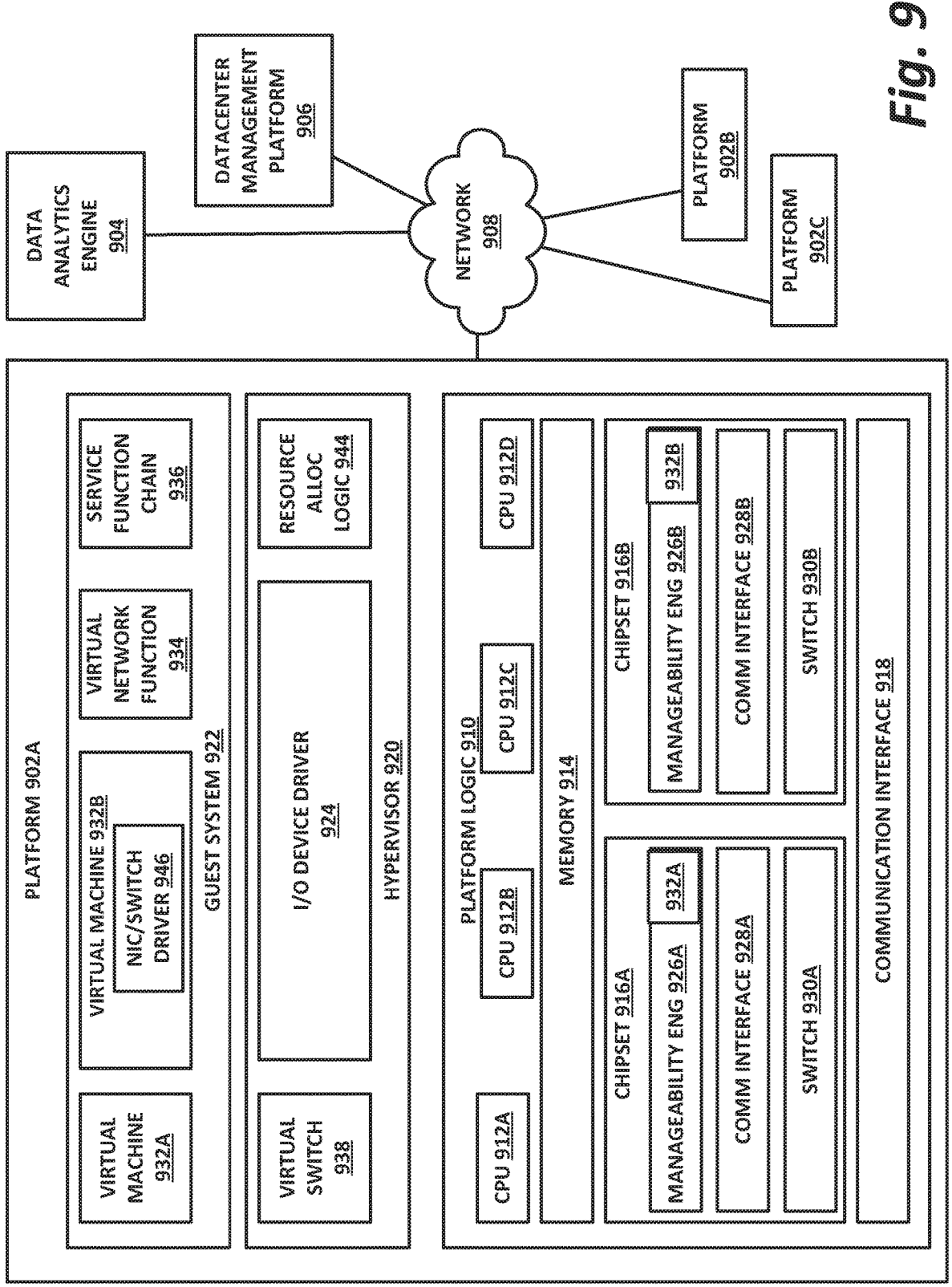

DETECTION AND MITIGATION OF FILELESS SECURITY THREATS

FIELD OF THE SPECIFICATION

This disclosure relates in general to the field of computer security, and more particularly, though not exclusively to, a system and method for providing detection and mitigation of fileless security threats.

BACKGROUND

Modern computers often have always-on Internet connections. Such connections can provide multiple vectors for security threats to attack a system.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIG. 9 is a block diagram of components of a computing platform, according to one or more examples of the present specification.

SUMMARY

Figure 1:
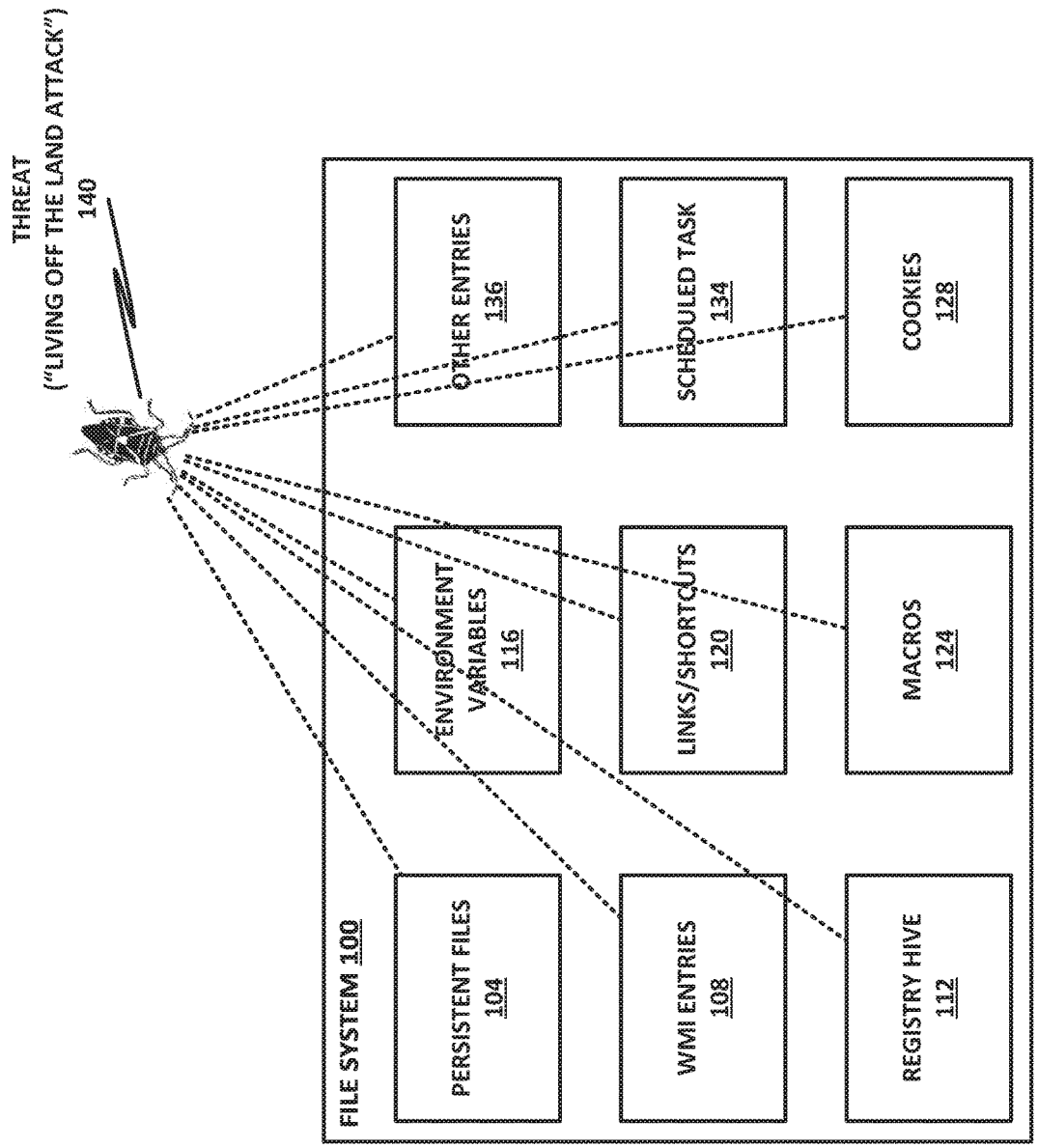
FIG. 1 is a block diagram illustrating a living off the land attack, according to one or more examples of the present specification.

In an example, there is disclosed a computing apparatus, including: a hardware platform; and a storage medium having stored thereon executable instructions to provide an inference engine configured to: receive a new suspicious fragment object from a protected device; add the new suspicious fragment object to a rolling map configured to provide a temporal snapshot of suspicious fragment objects over a time span; determine a connection between the new suspicious fragment object and an existing suspicious fragment object within the rolling map; apply the connection to a connection map; and operate a map classifier to determine that the connection map represents a probable computer security threat.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Traditionally, computer security threats have taken the form of portable executables (PEs), which surreptitiously install themselves or trick users into installing them into privileged process spaces. These PEs then perform some malicious or unwanted action on the target device. Many such PEs take steps to mask themselves or make themselves more difficult to remove, such as changing file names, recompiling, attacking boot sectors, or performing other tasks to make it difficult for antivirus or anti-malware solutions to mitigate attacks. Antivirus solutions providers such as McAfee®, Inc. have created ever more sophisticated detection and mitigation algorithms to defeat these purposes. Recently, bad actors have taken a new approach to attacks that does not rely on a PE, but rather takes the form of a so-called "living off the land" attack. A living off the land attack is a "fileless" attack, in which a single executable is not installed on the system. These fileless attacks are based on the principle that no single executable is required to perform an attack, because trusted and pre-existing system tools (such as PowerShell, VBS, Bash, or vulnerable executables) are sufficient to accomplish the goal. A living off the land attack may inject malicious scripts, parameters, and code fragments into various places across the file system, and a single persistent load point can then launch the attack by aggregating the various pieces at runtime. These fileless threats are difficult to detect and mitigate using traditional security measures such as antivirus.

Instead, novel approaches may use dynamic behavior analysis to detect fileless threats. While some of these are effective in detecting living off the land attacks, they can also be inefficient. Furthermore, the security perimeter formed by a dynamic behavior analysis tool can in some cases be bypassed with methods such as delayed execution.

Embodiments of the present specification provide a complementary system and method that can be used along with or in addition to traditional antivirus software and/or dynamic behavior analysis. The present specification provides a two-stage threat detection engine and inference engine that may be used, for example, as a supplement to traditional antivirus to inspect fileless fragments residing in the host operating system. The detection engine can detect suspicious fragments, while the inference engine can reconstruct a rolling map that represents a probable snapshot of an entire attack. Note that in some cases, the detection engine and the inference engine may be provided on a single system, while in other cases, they may be provided separately. For example, in one embodiment, a client device includes a standalone detection engine that detects suspicious code fragments, and uploads those code fragments to a security server that provides an inference engine. The inference engine can then infer the probability that the suspicious code fragments represent an attack or a threat such as a fileless threat, and can then provide mitigation instructions to client device. Furthermore, when the detection engine of the client uploads suspicious code fragments to the inference engine of the server, the inference engine may also predict code fragments that may be expected to occur in connection with the uploaded fragments. The server may then instruct the client to "hunt" for those fragments to see if they exist. Detection of such a fragment may strengthen the inference that a particular fragment is part of a fileless security threat. Advantageously, when the inference engine is hosted on a separate server, it can aggregate information from a plurality of clients to provide better threat inference. Such an inference engine may be hosted independently by the enterprise itself, or may be provided globally by a security services provider such as McAfee®.

In another embodiment, the inference engine may be provided on the same host as the detection engine. In that case, although the system may lack the advantages of aggregating data from a plurality of clients, other advantages may be realized, such as speed and coherency of execution, and a global view of the entire device by the inference engine.

Note that the threat mitigation system disclosed herein, including the detection engine and the inference engine, need not replace traditional antivirus solutions. Rather, this may be a complementary solution that covers gaps in detection in existing file-based and behavior analysis protection schemes.

A fileless or living off the land attack includes multiple fragments of code hosted or retrieved from multiple locations in such a way that, when used in conjunction, the attack can be performed. By way of nonlimiting example, the fragments may be listed in windows management instrumentation (WMI) entries, the registry hive, environment variables, links or shortcuts, macros, scheduled tasks, cookies, or other entries. In some cases, a living off the land attack may also place some code in a persistent file, or may compromise a persistent file to provide a persistent load point.

By way of example, a detection engine of the present specification may discover that a fragment is participating in a "commensalism relationship" (meaning, taking advantage of a host organism such as the registry hive or a scheduled task) to later reconstruct a rolling map that represents a probable snapshot of the entire attack. This approach is based on the persistence stage of the attack, which is currently one of four categories of living off the land attacks.

With the predicted snapshot of the potential attack, different remediation and/or protection measures may be applied. For example, preventive blocking of the involved system tools may be activated for a time, so that a responsible security actor can analyze the threat and determine whether further action is needed. The reconstructed map may also be reported back to a security actor, for example to the headquarters security operations center for further verification and update of existing security solutions. This may reduce the amount of time researchers spend in the discovery of new attacks. Advantageously, the system of the present specification can detect attacks that are not detectable by some known solutions, including file-based detection and dynamic behavior analysis detection. File-based detection has limited utility in living off the land attacks, because there may be no single PE to scan and detect. On the other hand, dynamic behavior analysis may be able to detect suspicious behavior while the attack is being executed. But this approach also has limitations. For example, bad actors have improved tactics to bypass dynamic behavior analysis by applying deferred execution or system checks to abort the attack near the detection point. Furthermore, dynamic behavior analysis is by its nature a reactive approach. The attack needs to be executed to be detected. Dormant code waiting to be activated may thus remain undetected by dynamic behavior analysis tools. Furthermore, dynamic behavior analysis may also result in some false negatives if the chained fragments composing the attack are not suspicious enough to reach the detection threshold, thus missing some potential attacks.

However, this should not be construed to imply that traditional PE-based detection and dynamic behavior analysis are useless or that they are to be completely supplanted by the system of the present specification. Rather, the system disclosed herein may in some cases be used as a complementary system to existing solutions. Thus, existing solutions may continue to perform those functions at which they excel, while the system of the present specification can bridge gaps in functionality, particularly in the case of dynamic behavior analysis. This increases the efficacy of threat detection. Note, however, that it is also possible to have embodiments that do not use dynamic behavior analysis, and that instead use the system taught in this specification as a standalone and unitary tool for detection of living off the land attacks.

A system and method for providing detection and mitigation of fileless security threats will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

Figure 7:
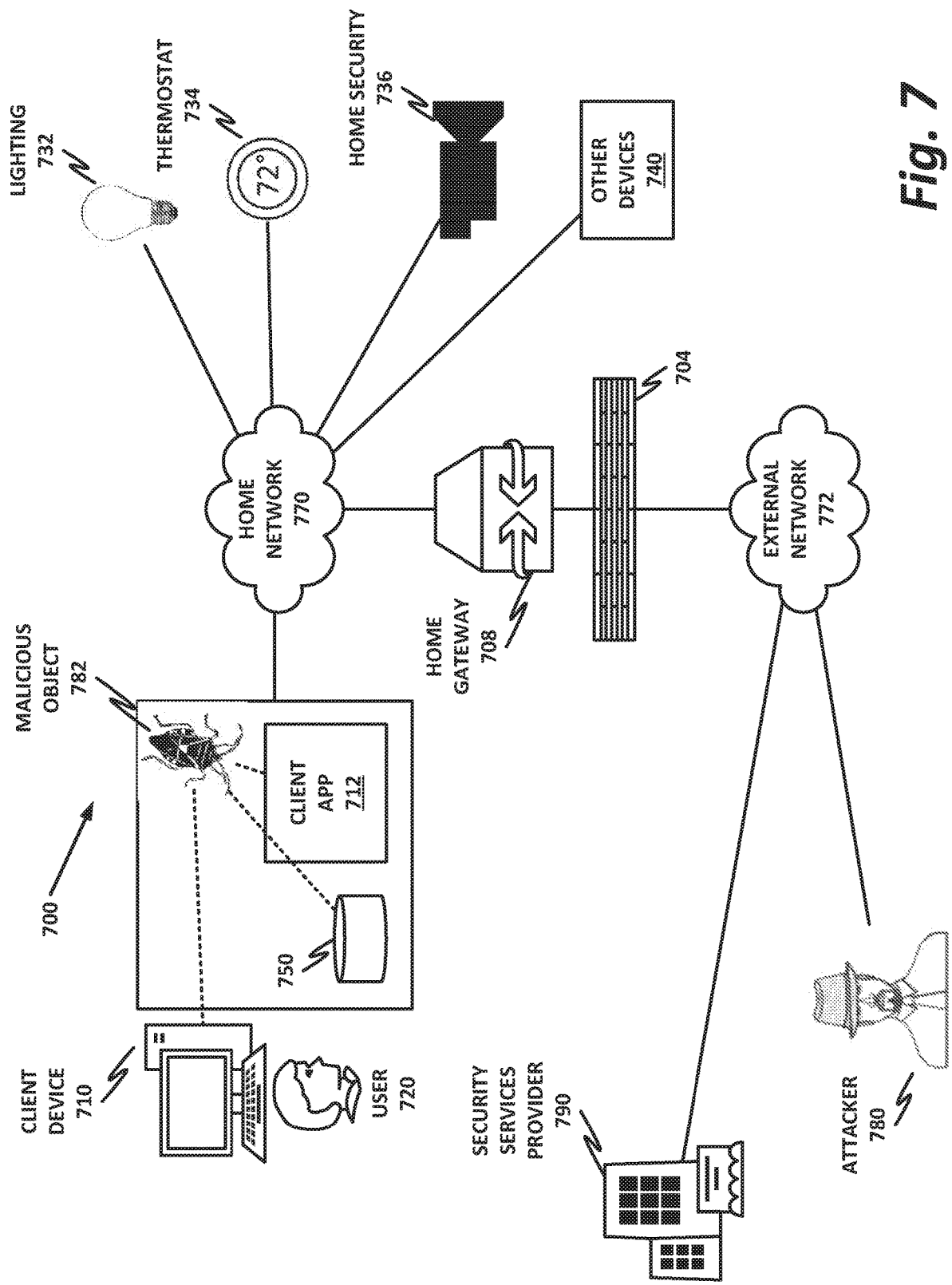
FIG. 7 is a block diagram of a home network, according to one or more examples of the present specification.

FIG. 1 is a block diagram illustrating a living off the land attack, according to one or more examples of the present specification. In this example, a living off the land attack 140 is a species of security threat. Threat 140 attacks a file system 100, which may be part of a computing system or some other hardware platform, as illustrated in other FIGURES, such as the hardware platform illustrated in FIGS. 8 and 9. Threat 140 may be a malicious object, as illustrated in FIG. 7, element 782 (malicious object).

In this case, threat 140 may not be a traditional PE malware object, but instead may be a fileless living off the land attack. Threat 140 attacks file system 100 by injecting code fragments into various persistent system elements. Persistent system elements may be characterized as elements that are not necessarily traditional files in the file system, but that are nonvolatile and persist. In some cases, these persistent elements may be included in binary "blobs" that themselves are stored in a file (e.g., the registry hive or a registry entry) but the persistent elements are not, themselves individual files. In other cases, they may be embedded in other files, such as macros embedded in documents with active content. In yet other cases, they may exist in the file system, but not as traditional files (e.g., symbolic links or shortcuts). Furthermore, in some cases, a traditional file may be used to store a code fragment (e.g., a dynamic link library or shared object library), even if the file is not a traditional, self-contained PE. These may include, by way of nonlimiting example, persistent files 104, WMI entries 108, registry hive 112, environment variables 116, links or shortcuts 120, macros 124, cookies 128, scheduled tasks 134, and other entries 136.

To provide an illustrative example, a scheduled task 134 or a persistent file 104, or any other suitable element, may provide a persistent load point for threat 140. Threat 140 may enter the targeted system, for example, via a phishing email, or via a worm, Trojan, or other similar attack vector. Code fragments are stored in these various elements of file system 100. While these elements are not, of themselves, traditional files, they are often persistent within the file system. But code fragments within the various elements of file system 100 may be unusual in character. For example, registry entries within registry hive 112 are commonly binary flags (0 or 1), small integer values, or strings (e.g., file paths or single words). It is uncommon for a registry entry to include a very large string encoded as base64. Thus, a registry entry with a long base64 string (e.g., "aGVsbG8gd29ybGQgdGhpcyBpcyBhbiBpbnZlbnRpb24=") it may be encoding source code that can be directly executed. The use of such base64 strings is preferred by some bad actors as a means of obfuscating malicious code and avoiding detection by traditional file-based antivirus scanners. So while there may be legitimate uses for such long base64 strings (e.g., storing an encryption key), the presence of such an entry may at least be treated as suspicious (e.g., the entry may be collected as a potential code fragment).

Similarly, environment variables often contain short strings or valid file system paths. An environment variable that contains instead a large integer, an unusual path, or other unusual data (such as a base64 string) may also be suspicious. Links or shortcuts 120 with large numbers of parameters—particularly large numbers of unknown parameters—may similarly be treated as suspicious.

Figure 2:
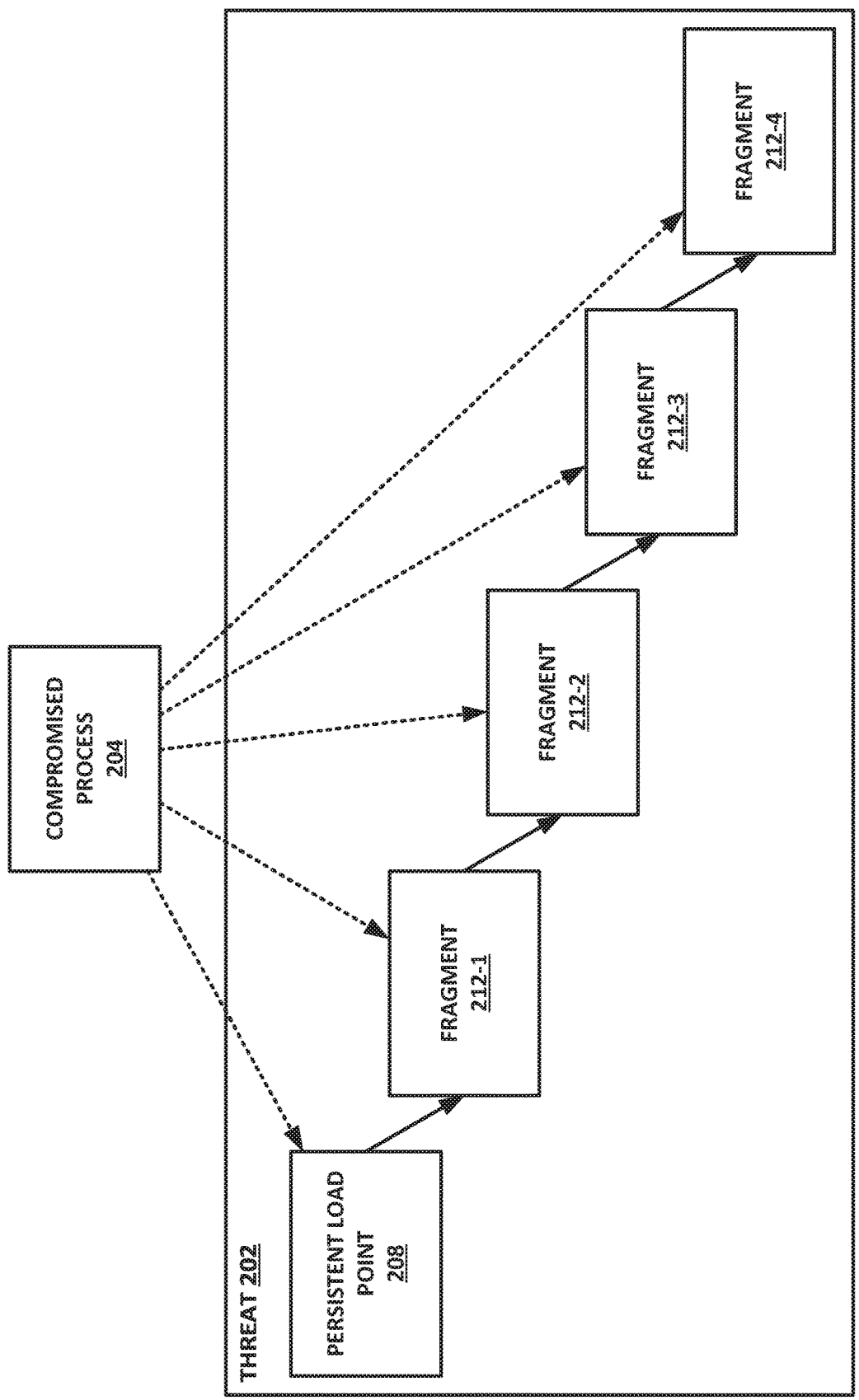
FIG. 2 is a block diagram of a fileless threat execution, according to one or more examples of the present specification.

FIG. 2 is a block diagram of a fileless threat execution, according to one or more examples of the present specification. The block diagram of FIG. 2 illustrates how a living off the land attack such as threat 140 of FIG. 1 may propagate.

In this example, the threat compromises a file or process, compromised process 204. This may be an executable file, or it may be some other commensalism host, such as a scheduled task. In some cases, the compromised process 204 is permitted to continue to carry out its ordinary task, but the fileless attack "piggybacks" on the legitimate task. Thus, for example, a scheduled task that performs a periodic update of a search database may also launch threat 202 from persistent load point 208. Persistent load point 208 may not itself be a persistent file such as persistent files 104 of FIG. 1, but may be one of the other elements illustrated in file system 100 of FIG. 1. Persistent load point 208 daisy chains together a number of fragments, in this case namely fragment 212-1, fragment 212-2, fragment 212-3, and fragment 212-4. Each fragment 212 contains a portion of the malicious script or binary that might otherwise have been stored in a PE.

For example, persistent load point 208 and fragments 212 may act as a "linked list," wherein each fragment 212 loads a portion of the code into memory, and also includes a pointer to the next fragment 212. In this manner, the entire threat 202 is able to operate on the target system, but can be hidden from traditional file-based antivirus scanners because the threat is distributed across several fragments, no one of which will match a "fingerprint" for a known malicious file. This may be true even if the threat itself has been detected and fingerprinted.

Figure 3:
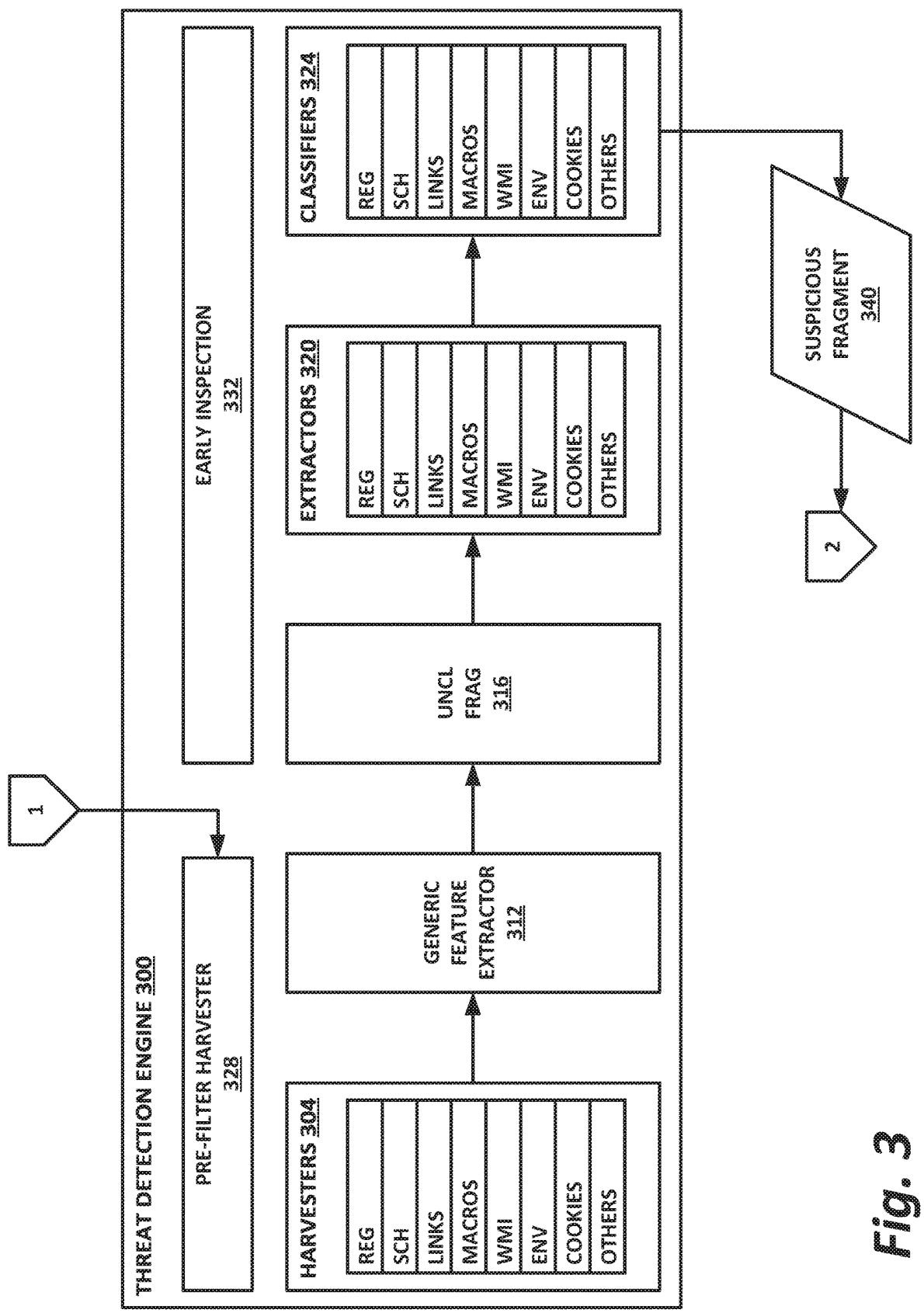
FIGS. 3 and 4 illustrate a threat detection engine and an inference engine, according to one or more examples of the present specification.
Figure 4:
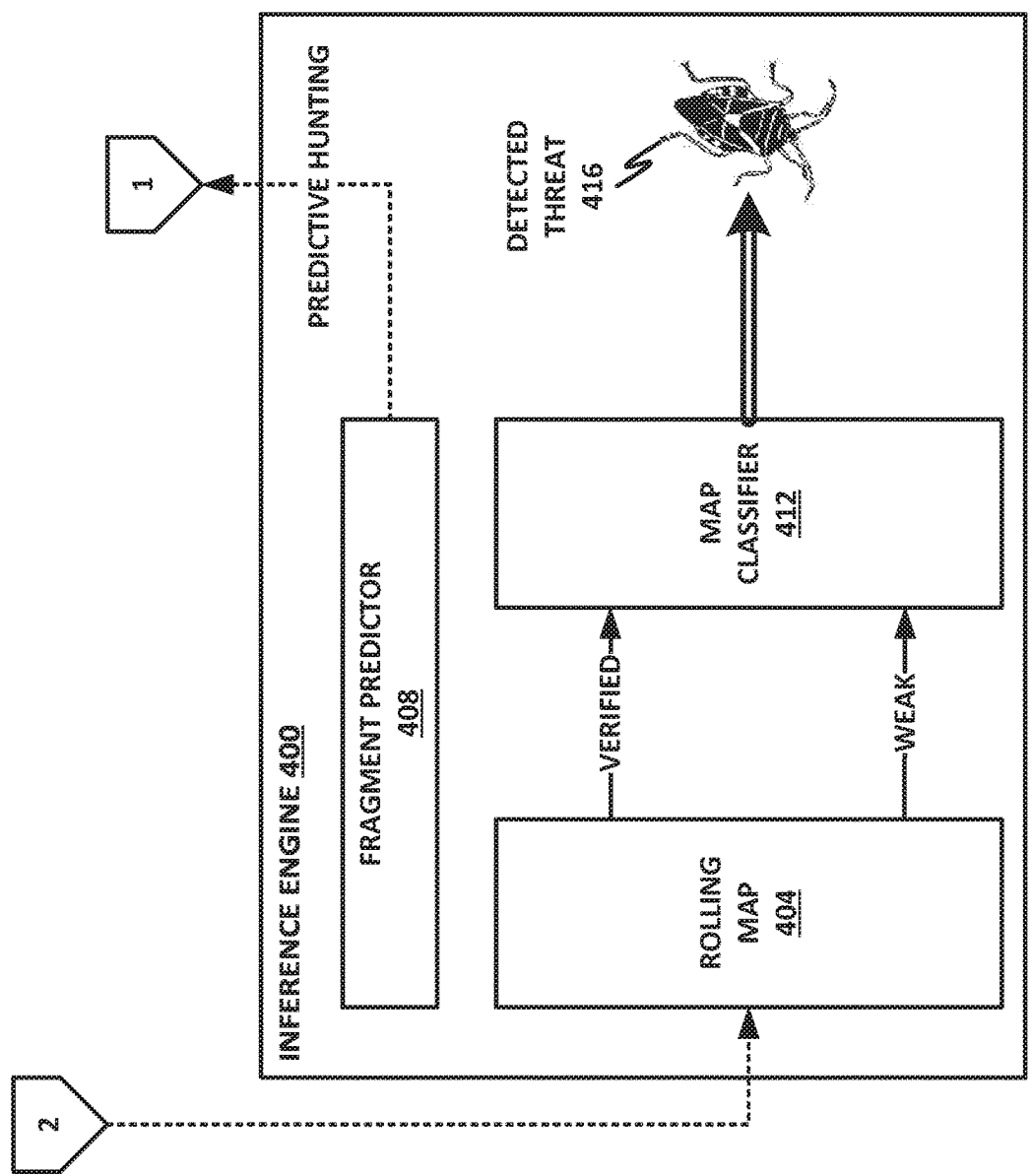

FIGS. 3 and 4 illustrate a threat detection engine 300 and an inference engine 400, according to one or more examples of the present specification. Threat detection engine 300 and inference engine 400 may be a species of operational agents such as operational agents 824 illustrated in FIG. 8. In this illustration, threat detection engine 300 and inference engine 400 are shown as separate engines, to illustrate that they may exist on separate hosts. However, this should be understood as a nonlimiting example. In other examples, both threat detection engine 300 and inference engine 400 could be provided on the same host, and in some cases within the same engine.

Note that threat detection engine 300 may be used to supplement existing solutions including file-based detection and dynamic behavior analysis protection. It is noted that file-based protection has limited utility for fileless attacks, because there is no PE file to scan and detect. On the other hand, dynamic behavior analysis, while useful, has some limitations as discussed above. The threat detection system of the present specification includes a two-stage method for identifying and mitigating fileless, living off the land type attacks. In the first stage, which may be referred to as a sensing or detecting stage, a threat detection engine 300 harvests and provides early classification of fragments. In the second stage, inference engine 400 attempts to reconstruct the map and the connections between the fragments to classify the threat or scenario.

Turning to FIG. 3, a threat detection engine 300 is illustrated. In this example, threat detection engine 300 includes a prefilter harvester 328, an early inspection module 332, harvesters 304, generic feature extractor 312, unclassified fragments 316, feature-specific extractors 320, and classifiers 324. A purpose of threat detection engine 300 is to identify a suspicious fragment 340.

Harvesters 304 may include, by way of nonlimiting example, a registry harvester, a scheduled task harvester, a link or shortcut harvester, a macro harvester, a WMI entry harvester, an environment variable harvester, a cookies harvester, and other harvesters.

Each harvester is focused on a particular commensalism host. A commensalism host may be defined as a temporal or permanent place in which a fragment may be located, which is often a disguised location (e.g., the registry hive or a scheduled task). Each harvester may implement a prefilter to collect samples that satisfy a probability of being considered a suspicious fragment. For example, an autorun registry entry of type REG_SZ with a data length of greater than 10 may be treated as suspicious. Note that treating the entry as suspicious does not imply that the entry is necessarily deemed malicious. Rather, treating the entry as suspicious merely implies that the fragment may be harvested for further analysis. Furthermore, harvesters 304 need not perform a full scan in each iteration. Rather, harvesters 304 may operate periodically. Once a baseline is established, harvesters 304 may inspect only new entries. For example, a registry harvester may inspect only entries that have been added or modified since the last registry scan.

Thus, in an illustrative example, harvesters 304 regularly harvest new or changed items within their respective responsibilities. Generic feature extractor 312 may then condition each harvested entry into an unclassified fragment 316.

Extractors 320 may include components specialized on fragments residing in the particular host, and may attempt to classify each fragment as suspicious or clear. Thus, specific extractors may be provided, for example, for registry, scheduled tasks, links, macros, WMI entries, environment variables, cookies, and others. Each extracted fragment may be then classified by its respective classifier 324. Specific classifiers may be provided for each class of fragment, for example, a registry classifier, a scheduled task classifier, a links classifier, a macros classifier, a WMI entry classifier, an environment variable classifier, a cookies classifier, and other classifiers. Classifiers 324 may be seeded with attributes and metadata that are common for the class of fragment. Suspicious or uncommon objects could include, by way of nonlimiting example:

a. Large base64 strings as registry entries.
 b. Scheduled tasks that execute a PowerShell script with parameters obtained from the registry hive.
 c. Shortcuts or links that, instead of opening an ordinary application or document, contain a complex command to download a file or code from the web (which may then be passed to some other fragment or script engine, such as Visual Basic).
 d. Environment variables that contain large base64 strings or raw script source code.

Classifiers 324 may also extract useful metadata, which may be used in the inference stage to estimate connections between the various fragments. Metadata may include, for example, where and when the fragment was found, which user account created the fragment, and other data that may be used to characterize or inspect the object.

Early inspection module 332 takes pre-filtered fragments and runs machine learning classifiers against them. The machine learning classifiers are specialized to each class of object, and classify the fragment as suspicious or not.

Note that harvesters 304 may optionally provide a prefilter that merely identifies candidate objects (e.g., new or updated entries and/or entries that meet other broad criteria for further analysis) but does not classify them as suspicious or not. Rather, classifiers 324 may classify the objects as suspicious or not.

While not mandatory, the funneling from harvesters 304 to classifiers 324 may enhance performance and efficiency. The system may first prefilter objects based on simple rules, and then classify only the ones that passed the gateway prefilter. This is especially beneficial in cases where many of the objects do not pass the prefilter. Full classification in those cases would mean that more detailed filters would be applied to every object, which could result in performance degradation.

Prefilter harvester 328 receives certain prefilter harvesting instructions from the inference stage, as illustrated in FIG. 4.

Ultimately, threat detection engine 300 may identify one or more suspicious fragments 340, which can then be provided to an inference stage, such as inference engine 400 of FIG. 4.

Turning to FIG. 4, an inference engine 400 is illustrated. If a fragment is classified as suspicious, then following off-page connector 2 from FIG. 3, the suspicious fragment is provided to inference engine 400. Suspicious fragment 340 is then added to a rolling map 404 of inference engine 400. Rolling map 404 is a temporal snapshot of all the suspicious fragments discovered during a configurable time period (e.g., one hour). The use of a temporal window helps to ensure that a bad actor's tactics, such as deferred execution, are accounted for, while at the same time reducing the chance of mis-classifying a map built from time-unrelated fragments.

Each time a fragment is added to rolling map 404, a fragment predictor 408 is invoked to determine probable connections between the various fragments within rolling map 404. Fragment predictor 408 analyzes the fragment content and metadata to infer previous and future connections based on both static analysis and probabilities, which may be obtained from a train model built with known samples. For example, when a registry hive fragment containing Base64 code is discovered, it may be probable that another fragment invoking PowerShell will be connected to the registry fragment. At first, these inferences are weak links to map classifier 412. But once a new fragment is added to the map, the weak link may be re-verified to determine if the connection has materialized. In other words, fragment predictor 408 may predict that a base64 registry entry will invoke a PowerShell fragment. The weak connection becomes a verified connection either when the invocation occurs, or when the next fragment is found and contains evidence of the connection. For example:

a. A registry entry is found containing a large base64 string. This registry entry is marked as suspicious and provided to the inference engine.
 b. The inference engine predicts that a scheduled task that invokes PowerShell may be connected to the suspicious registry entry fragment. Since this is a prediction, the connection is initially deemed "weak."
 c. The inference engine initiates a predictive hunting action for the predicted next fragment in the map, or a short time later the detection engine itself discovers a new fragment that is a scheduled task. The command of the scheduled task refers to the registry entry previously found. Now the connection is evident and is "verified."

When fragment predictor 408 identifies a probable future connection, it may trigger a predictive hunting signal to the harvesters. Following off-page connector 1 back to FIG. 3, this predictive hunting signal is fed to prefilter harvester 328 of threat detection engine 300. The predictive hunting signal may contain information retrieved from a fragment being analyzed to help prefilter harvester 328 to find the suspected next fragment in the system. For example, if fragment predictor 408 is currently analyzing a registry hive fragment containing an autorun key targeting a file, fragment predictor 408 may signal prefilter harvester 328 to look for that specific file. This single instance operation may override one of the various harvesters' prefilters temporarily, as the search criterion is well-defined for that harvester in this instance.

Finally, map classifier 412 may be invoked to analyze a snapshot of rolling map 404. Map classifier 412 may run based on a predefined threshold, such as a number of fragments discovered, and/or a number of connections verified. For example, a map may be considered suspicious when three or more fragments are discovered, with at least one verified connection. These fragments may then be flagged, and preventive, remediation, or reporting tasks may be triggered in response if the map is classified as a detected threat 416. Map classifier 412 specifically searches for a map of a fileless and distributed threat such as threat 202. In other words, if rolling map 404 identifies persistent load point 208, fragment 212-1, and fragment 212-3 of threat 202, then the map may be flagged as suspicious. The suspicion is strengthened if there is a verified connection, for example between persistent load point 208 and fragment 212-1. Fragment predictor 408 may instruct prefilter harvester 328 to search for suspected fragment 212-2 and suspected fragment 212-4. If these are found as expected, the links between them may be considered verified. Once threat 202 and at least some of its fragments 212 are mapped, map classifier 412 may designate the map as a detected threat 416, so that remedial action may be taken.

Figure 5A:
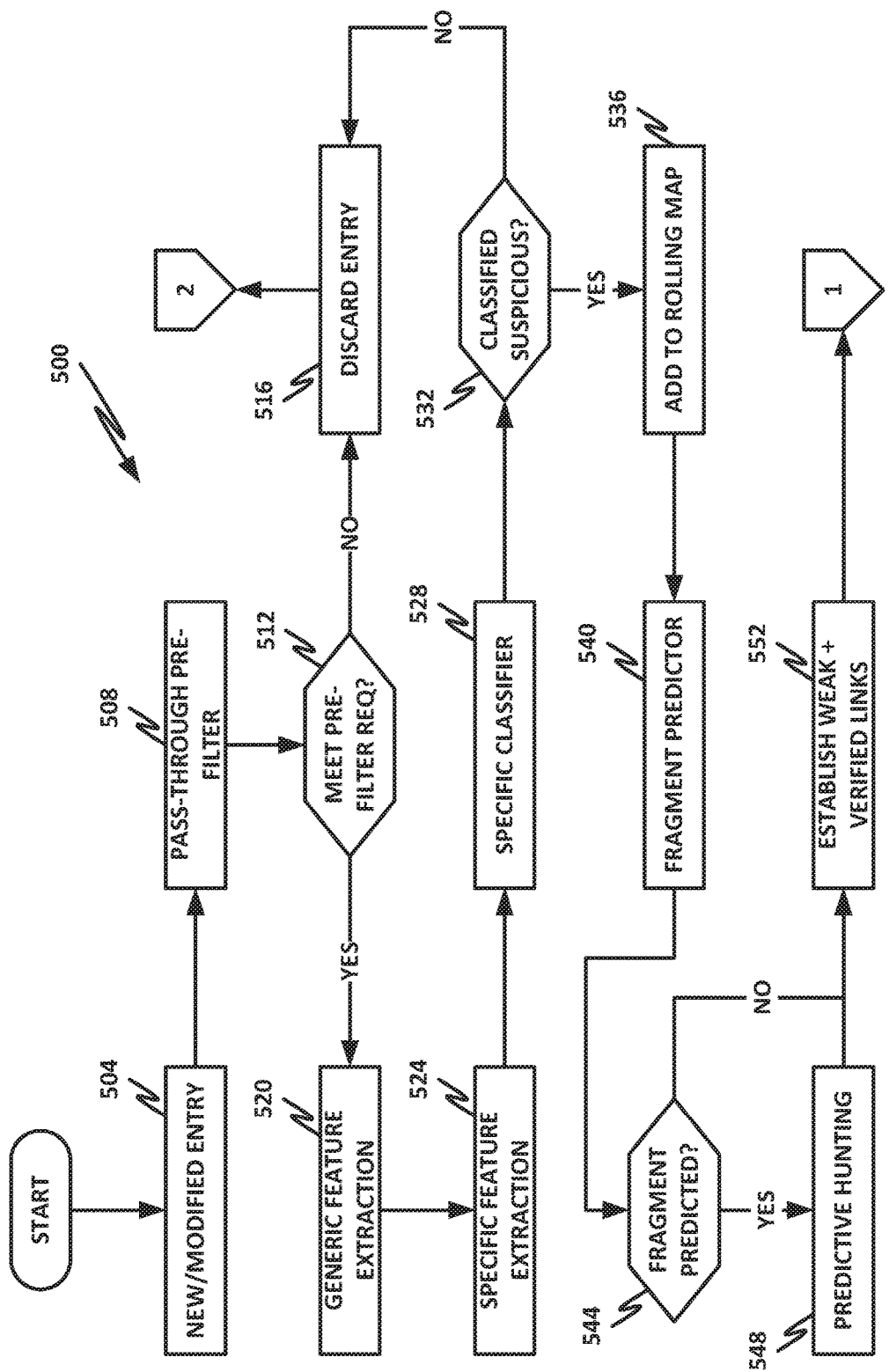
FIGS. 5a and 5b are a flowchart of a method of detecting and mitigating a fileless attack, according to one or more examples of the present specification.
Figure 5B:
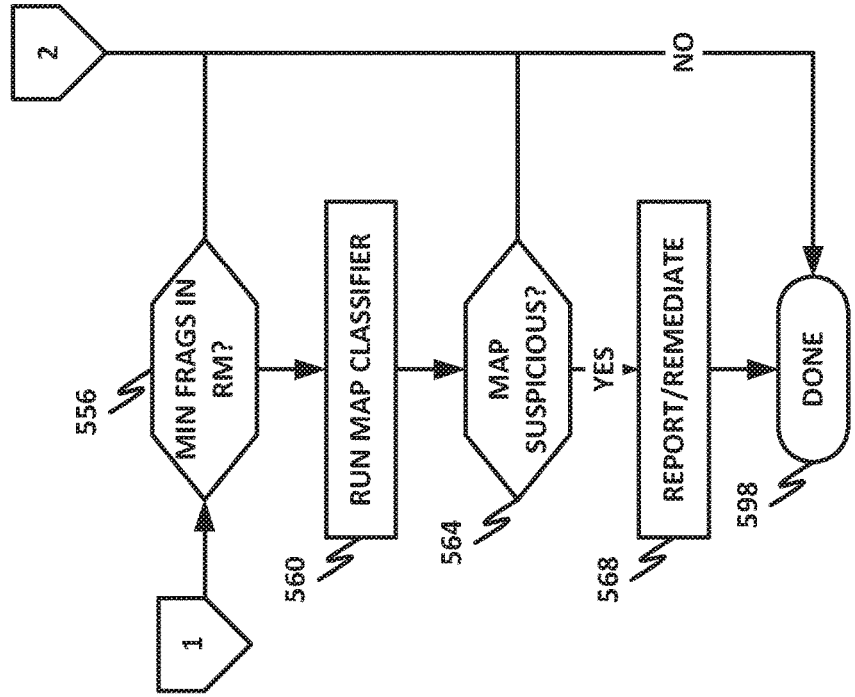

FIGS. 5a and 5b are a flowchart of a method 500 of detecting and mitigating a fileless attack, according to one or more examples of the present specification.

Starting in block 504 of FIG. 5a, a new or modified entry is harvested within one of the target blocks such as registry entries, scheduled tasks, links, macros, WMI entries, environment variables, cookies, and others by way of nonlimiting example.

In block 508, the newly identified or modified entry is passed through a prefilter. For example, the prefilter may determine whether the new or modified entry has one or more indicia of being suspicious (e.g., a Base64 registry entry).

In decision block 512, if the new entry does not satisfy the minimum prefilter conditions, then in block 516, the entry is discarded, and following off-page connector 2 to FIG. 5b, in block 598, the method is done.

Returning to decision block 512, if the newly detected entry meets the prefilter requirements, then in block 520, the new entry is subjected to generic feature extraction. This can be an uncomplicated process that simply extracts the operative portion of the feature.

In block 524, the system runs host organism specific feature extraction for the entry. This may be a more specific feature extractor that is designed specifically to extract elements of the class of feature that the entry belongs to.

In block 528, the feature is subjected to host organism specific classifiers. This provides a more refined view into whether the fragment is suspicious. For example, a registry entry may not pass the prefilter in block 512 if it is a simple Boolean flag, while in block 532, the feature may be subjected to more detailed scrutiny to determine whether it is of a suspicious character as discussed herein.

If the fragment is not classified as suspicious, then in block 516, the entry is discarded, and flow proceeds as previously described.

Returning to block 532, if the block is classified as suspicious, then in block 536, the suspicious fragment is added to a rolling map.

In block 540, the fragment predictor may be run to predict previous or next fragments within the chain that is being mapped.

In decision block 544, if a previous or next fragment in the chain is predicted, then in block 548, predictive hunting may be triggered.

In block 552, fragments that have either been identified through ordinary detection or through predictive hunting are examined to establish weak or verified links.

Following off-page connector 1 to FIG. 5b, the inference stage determines whether a minimum number of fragments have been identified in the current rolling map, and/or whether the identified fragments have sufficient weak or verified links to trigger a map classifier.

If there are insufficient links, then in block 598, the method is done. Returning to block 556, if sufficient fragments and/or links have been identified, then in block 560, the map classifier is run. The map classifier determines to map a list of fragments that form a fully embodied threat.

In decision block 564, if the current map is not identified as suspicious, then in block 598, the method is done.

Returning to block 564, if the current map is determined to be suspicious, then in block 568, the system may report and/or provide remediation for the threat.

In block 598, the method is done.

Figure 6:
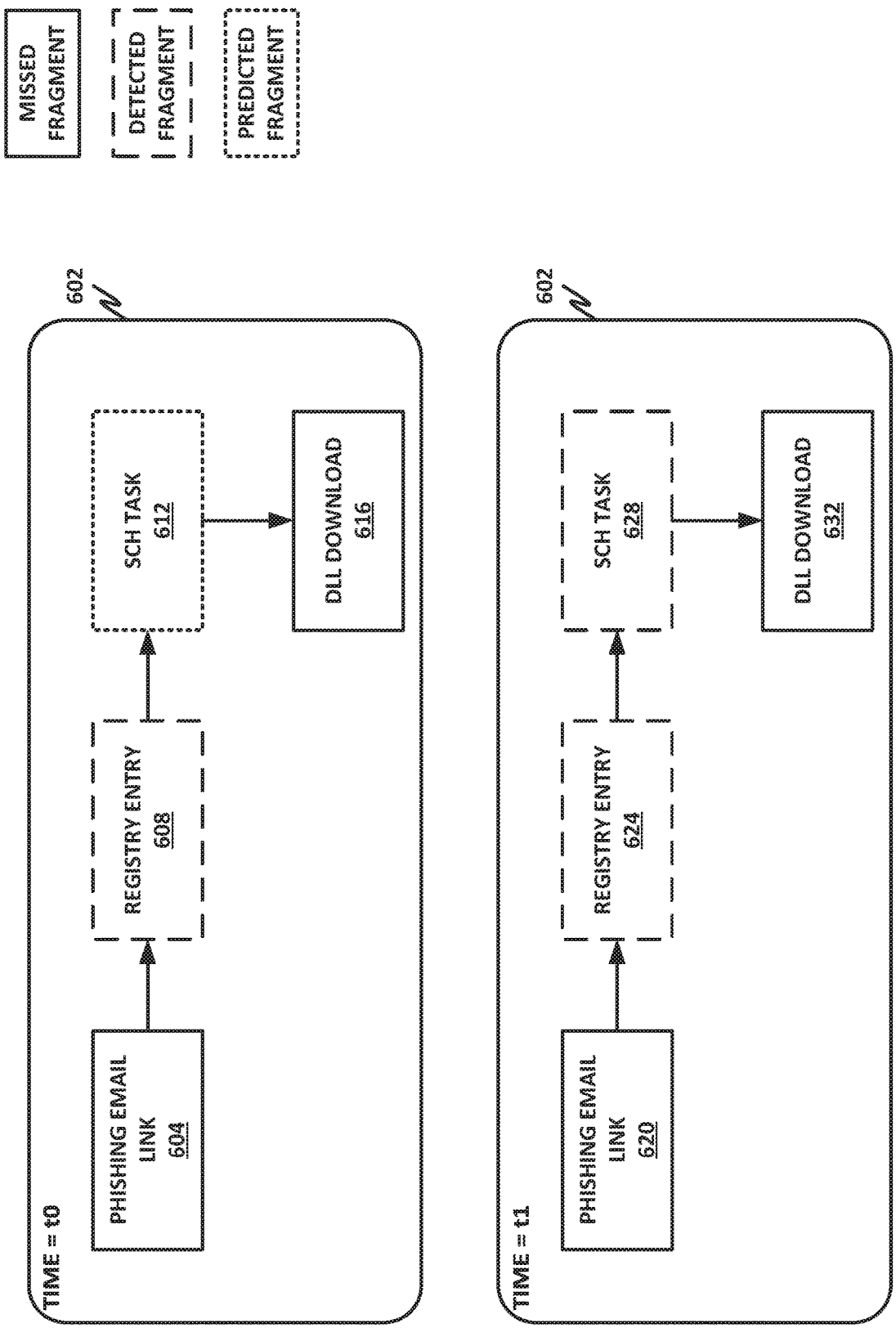
FIG. 6 is a block diagram illustrating an operative example of the teachings herein, according to one or more examples of the present specification.

FIG. 6 is a block diagram illustrating an operative example of the teachings of the present specification. In this case, a living off the land attack 602 may target a victim device, for example, via delivery in a phishing email link, or through some other known means, such as lateral movement, worms, Trojans, or other attack vectors.

The map for living off the land attack 602 includes a registry entry 608, a scheduled task 612, and a dynamic link library (DLL) download 616. Thus, phishing email link 604 installs a new registry key set with a Base64 string as its data value. At the same time, a scheduled task may be created to run after 15 minutes and execute PowerShell, passing as an argument the Base64 value retrieved from the previously stated registry key entry.

This simple attack includes three fragments: the deployment fragment (e.g., a shell link attached in a phishing email 620), a registry hive fragment 624 (containing a Base64 PowerShell code), and a scheduled task fragment 628 that executes the source code hosted in the registry entry.

FIG. 6 illustrates the fragments involved in this attack, including some missed fragments which demonstrate that it is not necessary to discover all the fragments to classify a map as suspicious.

The system disclosed herein would harvest both registry hive fragment 608 and scheduled task fragment 612. These unclassified fragments may be judged based on extracted features, such as for example a registry entry containing an abnormal data value (Base64 code) and a scheduled task using PowerShell and referencing a registry hive location. Once the system determines that these fragments are suspicious, the rolling map may be updated to include them. Based on this update, a fragment predictor may attempt to link the fragments based on their contents (e.g., a key/value set) and metadata (e.g., commensalism host location, time creation proximity, content cross-references, and others). Finally, the map classifier may elaborate a conclusion based on the features extracted from the map in comparison with previously known attacks using a trained classifier.

Note that in the example of FIG. 6, the attack may be detected at both time=t0 and at time=t1. In the case of time=t0, phishing email link 604 and DLL download 616 may be missed fragments. These fragments are not identified by the system. But, at time=t0, registry entry 608 is detected, and the scheduled task is predicted. This may trigger a predictive hunting, which leads to time=t1. At time=t1, scheduled task 628 has been found by predictive hunting. A link may now be established between the two. For example, if registry entry 624 is explicitly called by scheduled task 628 (e.g., scheduled task 628 launches a PowerShell command with registry entry 624 as a command line parameter), then a verified link between the two fragments is identified. A weak link could be identified simply because they execute close in time, or because they were created at approximately the same time, or within the same rolling map frame.

Thus, although phishing email link 620 and DLL download 632 may not have been identified, the attack itself can be remediated because registry entry 608 and/or scheduled task 628 have been identified. These can be interrupted, and remedial action can be taken so that malicious harm is not able to be done to the system.

In the case of a distributed deployment, for example where inference engine 400 of FIG. 4 is hosted on a server that services a number of clients, detection may be improved over time. For example, on a second host at time=t0, registry entry 608 and scheduled task 612 may both be identified. Furthermore, if registry entry 608 can be linked to phishing email link 604, then phishing email link 604 may also be identified. As the database grows and more threats are identified, the accuracy of detection increases. Furthermore, as the database grows, the types of attributes that are identified as suspicious may also be refined, to better eliminate both false positives and false negatives.

FIG. 7 is a network-level diagram of a home network 700, according to one or more examples of the present specification. Embodiments of home network 700 disclosed herein may be adapted or configured to provide the method of detection and mitigation of fileless security threats according to the teachings of the present specification.

In the example of FIG. 7, home network 700 may be a "smart home" with various Internet of things (IoT) devices that provide home automation or other services. Home network 700 is provided herein as an illustrative and nonlimiting example of a system that may employ and benefit from the teachings of the present specification. But it should be noted that the teachings may also be applicable to many other entities including, by way of nonlimiting example, an enterprise, data center, telecommunications provider, government entity, or other organization.

Within home network 700, one or more users 720 operate one or more client devices 710. A single user 720 and single client device 710 are illustrated here for simplicity, but a home or enterprise may have multiple users, each of which may have multiple devices.

Client devices 710 may be communicatively coupled to one another and to other network resources via home network 770. Home network 770 may be any suitable network or combination of one or more networks operating on one or more suitable networking protocols, including a local area network, an intranet, a virtual network, a wide area network, a wireless network, a cellular network, or the Internet (optionally accessed via a proxy, virtual machine, or other similar security mechanism) by way of nonlimiting example. Home network 770 may also include one or more servers, firewalls, routers, switches, security appliances, antivirus servers, or other network devices, which may be single-purpose appliances, virtual machines, containers, or functions running on client devices 710.

In this illustration, home network 770 is shown as a single network for simplicity, but in some embodiments, home network 770 may include any number of networks, such as one or more intranets connected to the Internet. Home network 770 may also provide access to an external network, such as the Internet, via external network 772. External network 772 may similarly be any suitable type of network.

Home network 770 may connect to the Internet via a home gateway 708, which may be responsible, among other things, for providing a logical boundary between home network 772 and external network 770. Home network 770 may also provide services such as dynamic host configuration protocol (DHCP), gateway services, router services, and switching services, and may act as a security portal across home boundary 704.

Home network 700 may also include a number of discrete IoT devices, which in contemporary practice are increasing regularly. For example, home network 700 may include IoT functionality to control lighting 732, thermostats or other environmental controls 734, a home security system 736, and any number of other devices 740. Other devices 740 may include, as illustrative and nonlimiting examples, network attached storage (NAS), computers, printers, smart televisions, smart refrigerators, smart vacuum cleaners and other appliances, and network connected vehicles.

Home network 700 may communicate across home boundary 704 with external network 772. Home boundary 704 may represent a physical, logical, or other boundary. External network 772 may include, for example, websites, servers, network protocols, and other network-based services. In one example, an attacker 780 (or other similar malicious or negligent actor) also connects to external network 772. A security services provider 790 may provide services to home network 700, such as security software, security updates, network appliances, or similar. For example, McAfee, Inc. provides a comprehensive suite of security services that may be used to protect home network 700.

It may be a goal of users 720 and home network 700 to successfully operate client devices 710 and IoT devices without interference from attacker 780 or from unwanted security objects. In one example, attacker 780 is a malware author whose goal or purpose is to cause malicious harm or mischief, for example, by injecting malicious object 782 into client device 710. According to embodiments of the present specification, malicious object 782 may include a fileless attack or a living off the land attack. Fileless attacks or living off the land attacks may be considered security threats or attacks, by way of nonlimiting example.

Once malicious object 782 gains access to client device 710, it may try to perform work such as social engineering of user 720, a hardware-based attack on client device 710, modifying storage 750 (or volatile memory), modifying client application 712 (which may be running in memory), or gaining access to home resources. Furthermore, attacks may also be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 780 to leverage against home network 770.

Malicious harm or mischief may take the form of installing root kits or other malware on client devices 710 to tamper with the system, installing spyware or adware to collect personal and commercial data, defacing websites, operating a botnet such as a spam server, or simply to annoy and harass users 720. Thus, one aim of attacker 780 may be to install his malware on one or more client devices 710 or any of the IoT devices described. As used throughout this specification, malicious software ("malware") includes any security object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, covert data collection, browser hijacking, network proxy or redirection, covert tracking, data logging, keylogging, excessive or deliberate barriers to removal, contact harvesting, and unauthorized self-propagation.

In enterprise cases, attacker 780 may also want to commit industrial or other espionage, such as stealing classified or proprietary data, stealing identities, or gaining unauthorized access to enterprise resources. Thus, attacker 780's strategy may also include trying to gain physical access to one or more client devices 710 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 780. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Home network 700 may contract with or subscribe to a security services provider 790, which may provide security services, updates, antivirus definitions, patches, products, and services. McAfee®, Inc. is a nonlimiting example of such a security services provider that offers comprehensive security and antivirus solutions. In some cases, security services provider 790 may include a threat intelligence capability such as the global threat intelligence (GTI™) database provided by McAfee Inc. Security services provider 790 may update its threat intelligence database by analyzing new candidate malicious objects as they appear on client networks and characterizing them as malicious or benign.

Other considerations may include parents' desire to protect their children from undesirable content, such as pornography, adware, spyware, age-inappropriate content, advocacy for certain political, religious, or social movements, or forums for discussing illegal or dangerous activities, by way of nonlimiting example.

Figure 8:
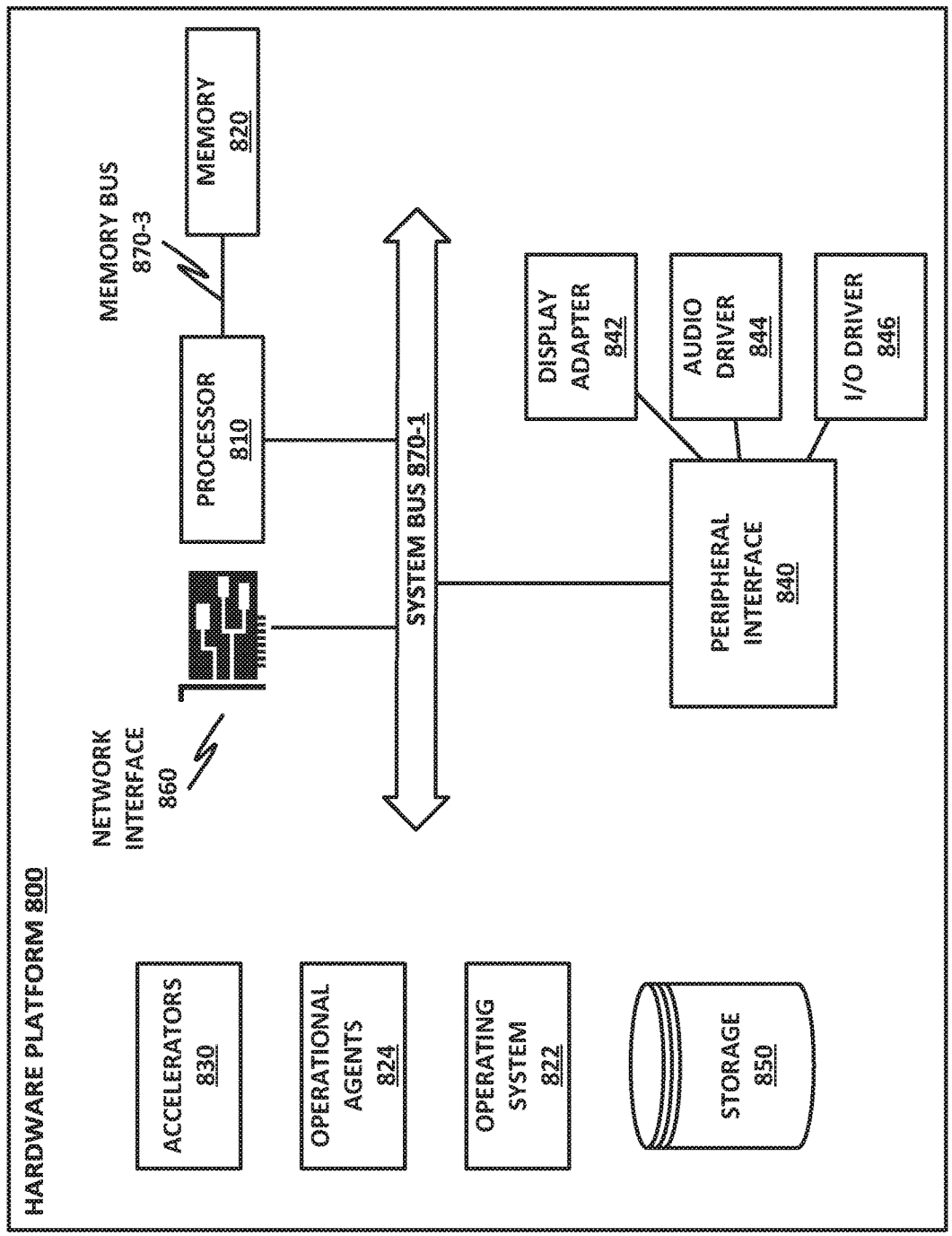
FIG. 8 is a block diagram of a hardware platform, according to one or more examples of the present specification.

FIG. 8 is a block diagram of hardware platform 800, according to one or more examples of the present specification. Embodiments of hardware platform 800 disclosed herein may be adapted or configured to provide the method of detection and mitigation of fileless security threats according to the teachings of the present specification.

Hardware platform 800 may represent any suitable computing device. In various embodiments, a "computing device" may be or comprise, by way of nonlimiting example, a computer, workstation, server, mainframe, virtual machine (whether emulated or on a "bare-metal" hypervisor), network appliance, container, IoT device, embedded computer, embedded controller, embedded sensor, personal digital assistant, laptop computer, cellular telephone, Internet protocol (IP) telephone, smart phone, tablet computer, convertible tablet computer, computing appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it, including any device hosted on the same hardware but that is logically separated (e.g., a different virtual machine, container, or guest) may be designated as a "remote host."

In certain embodiments, client devices 710, home gateway 708, and the IoT devices illustrated in FIG. 7 may all be examples of devices that run on a hardware platform such as hardware platform 800. FIG. 8 presents a view of many possible elements that may be included in a hardware platform, but it should be understood that not all of these are necessary in every platform, and platforms may also include other elements. For example, peripheral interface 840 may be an essential component in a user-class device to provide input and output, while it may be completely unnecessary in a virtualized server or hardware appliance that communicates strictly via networking protocols.

By way of illustrative example, hardware platform 800 provides a processor 810 connected to a memory 820 and other system resources via one or more buses, such a system bus 870-1 and a memory bus 870-3.

Other components of hardware platform 800 include a storage 850, network interface 860, and peripheral interface 840. This architecture is provided by way of example only, and is intended to be nonexclusive and nonlimiting. Furthermore, the various parts disclosed are intended to be logical divisions only, and need not necessarily represent physically separate hardware and/or software components. Certain computing devices provide main memory 820 and storage 850, for example, in a single physical memory device, and in other cases, memory 820 and/or storage 850 are functionally distributed across many physical devices. In the case of virtual machines or hypervisors, all or part of a function may be provided in the form of software or firmware running over a virtualization layer to provide the disclosed logical function, and resources such as memory, storage, and accelerators may be disaggregated (i.e., located in different physical locations across a data center). In other examples, a device such as a network interface 860 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

In various examples, a "processor" may include any combination of logic elements operable to execute instructions, whether loaded from memory, or implemented directly in hardware, including, by way of nonlimiting example, a microprocessor, digital signal processor, field-programmable gate array, graphics processing unit, programmable logic array, application-specific integrated circuit, or virtual machine processor. In certain architectures, a multi-core processor may be provided, in which case processor 810 may be treated as only one core of a multi-core processor, or may be treated as the entire multi-core processor, as appropriate. In some embodiments, one or more co-processors may also be provided for specialized or support functions.

Processor 810 may be communicatively coupled to devices via a system bus 870-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of nonlimiting example only, and that some embodiments may omit one or more of the foregoing buses, while others may employ additional or different buses. Common buses include peripheral component interconnect (PCI) and PCI express (PCIe), which are based on industry standards. However, system bus 870-1 is not so limited, and may include any other type of bus. Furthermore, as interconnects evolve, the distinction between a system bus and the network fabric is sometimes blurred. For example, if a node is disaggregated, access to some resources may be provided over the fabric, which may be or include, by way of nonlimiting example, Intel® Omni-Path™ Architecture (OPA), TrueScale™, Ultra Path Interconnect (UPI) (formerly called QPI or KTI), Fibre-Channel, Ethernet, FibreChannel over Ethernet (FCoE), InfiniBand, PCI, PCIe, or fiber optics, to name just a few.

In an example, processor 810 is communicatively coupled to memory 820 via memory bus 870-3, which may be, for example, a direct memory access (DMA) bus, though other memory architectures are possible, including ones in which memory 820 communicates with processor 810 via system bus 870-1 or some other bus. In the same or an alternate embodiment, memory bus 870-3 may include remote direct memory access (RDMA), wherein processor 810 accesses disaggregated memory resources via DMA or DMA-like interfaces.

To simplify this disclosure, memory 820 is disclosed as a single logical block, but in a physical embodiment may include one or more blocks of any suitable volatile or nonvolatile memory technology or technologies, including, for example, double data rate random access memory (DDR RAM), static random access memory (SRAM), dynamic random access memory (DRAM), persistent random access memory (PRAM), or other similar persistent fast memory, cache, Layer 1 (L1) or Layer 2 (L2) memory, on-chip memory, registers, flash, read-only memory (ROM), optical media, virtual memory regions, magnetic or tape memory, or similar. In certain embodiments, memory 820 may comprise a relatively low-latency volatile main memory, while storage 850 may comprise a relatively higher-latency nonvolatile memory. However, memory 820 and storage 850 need not be physically separate devices, and in some examples may represent simply a logical separation of function. It should also be noted that although DMA is disclosed by way of nonlimiting example, DMA is not the only protocol consistent with this specification, and that other memory architectures are available.

Storage 850 may be any species of memory 820, or may be a separate device. Storage 850 may include one or more non-transitory computer-readable mediums, including, by way of nonlimiting example, a hard drive, solid-state drive, external storage, microcode, hardware instructions, redundant array of independent disks (RAID), network attached storage, optical storage, tape drive, backup system, cloud storage, or any combination of the foregoing. Storage 850 may be, or may include therein, a database or databases or data stored in other configurations, and may include a stored copy of operational software such as operating system 822 and software portions, if any, of operational agents 824, accelerators 830, or other engines. Many other configurations are also possible, and are intended to be encompassed within the broad scope of this specification.

As necessary, hardware platform 800 may include an appropriate operating system, such as Microsoft Windows, Linux, Android, Mac OSX, Apple iOS, Unix, or similar. Some of the foregoing may be more often used on one type of device than another. For example, desktop computers or engineering workstations may be more likely to use one of Microsoft Windows, Linux, Unix, or Mac OSX. Laptop computers, which are usually a portable, off-the-shelf device with fewer customization options, may be more likely to run Microsoft Windows or Mac OSX. Mobile devices may be more likely to run Android or iOS. However, these examples are not intended to be limiting. Furthermore, hardware platform 800 may be configured for virtualization or containerization, in which case it may also provide a hypervisor, virtualization platform, virtual machine manager (VMM), orchestrator, containerization platform, or other infrastructure to provide flexibility in allocating resources.

Network interface 860 may be provided to communicatively couple hardware platform 800 to a wired or wireless network or fabric. A "network," as used throughout this specification, may include any communicative platform operable to exchange data or information within or between computing devices, including, by way of nonlimiting example, a local network, a switching fabric, an ad-hoc local network, an Internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Operational agents 824 are one or more computing engines that may include one or more non-transitory computer-readable mediums having stored thereon executable instructions operable to instruct a processor to provide operational functions. At an appropriate time, such as upon booting hardware platform 800 or upon a command from operating system 822 or a user or security administrator, processor 810 may retrieve a copy of operational agents 824 (or software portions thereof) from storage 850 and load it into memory 820. Processor 810 may then iteratively execute the instructions of operational agents 824 to provide the desired methods or functions.

As used throughout this specification, an "engine" includes any combination of one or more logic elements, of similar or dissimilar species, operable for and configured to perform one or more methods provided by the engine. In some cases, the engine may include a special integrated circuit designed to carry out a method or a part thereof, a field-programmable gate array (FPGA) programmed to provide a function, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware and software, including configuration files, registry entries, application programming interfaces (APIs), and interactive or user-mode software by way of nonlimiting example.

Peripheral interface 840 may be configured to interface with any auxiliary device that connects to hardware platform 800 but that is not necessarily a part of the core architecture of hardware platform 800. A peripheral may be operable to provide extended functionality to hardware platform 800, and may or may not be wholly dependent on hardware platform 800. In some cases, a peripheral may be a computing device in its own right. Peripherals may include input and output devices such as displays, terminals, printers, keyboards, mice, modems, data ports (e.g., serial, parallel, universal serial bus (USB), Firewire, or similar), network controllers, optical media, external storage, sensors, transducers, actuators, controllers, data acquisition buses, cameras, microphones, speakers, or external storage, by way of nonlimiting example.

In one example, peripherals include display adapter 842, audio driver 844, and input/output (I/O) driver 846. Display adapter 842 may be configured to provide a human-readable visual output, such as a command line interface (CLI) or graphical desktop such as Microsoft Windows, Apple OSX desktop, or a Unix/Linux X Window System-based desktop. Display adapter 842 may provide output in any suitable format, such as a coaxial output, composite video, component video, video graphics array (VGA), or digital outputs such as digital visual interface (DVI) or high definition multimedia interface (HDMI), by way of nonlimiting example. In some examples, display adapter 842 may include a hardware graphics card, which may have its own memory and its own graphics processing unit (GPU). Audio driver 844 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of nonlimiting example.

FIG. 9 is a block diagram of components of a computing platform 902A, according to one or more examples of the present specification. Embodiments of computing platform 902A disclosed herein may be adapted or configured to provide the method of detection and mitigation of fileless security threats according to the teachings of the present specification.

In the embodiment depicted, platforms 902A, 902B, and 902C, along with a data center management platform 906 and data analytics engine 904 are interconnected via network 908. In other embodiments, a computer system may include any suitable number (i.e., one or more) of platforms. In some embodiments (e.g., when a computer system only includes a single platform), all or a portion of the system management platform 906 may be included on a platform 902. A platform 902 may include platform logic 910 with one or more central processing units (CPUs) 912, memories 914 (which may include any number of different modules), chipsets 916, communication interfaces 918, and any other suitable hardware and/or software to execute a hypervisor 920 or other operating system capable of executing workloads associated with applications running on platform 902. In some embodiments, a platform 902 may function as a host platform for one or more guest systems 922 that invoke these applications. Platform 902A may represent any suitable computing environment, such as a high performance computing environment, a data center, a communications service provider infrastructure (e.g., one or more portions of an Evolved Packet Core), an in-memory computing environment, a computing system of a vehicle (e.g., an automobile or airplane), an IoT environment, an industrial control system, other computing environment, or combination thereof.

In various embodiments of the present disclosure, accumulated stress and/or rates of stress accumulated of a plurality of hardware resources (e.g., cores and uncores) are monitored and entities (e.g., system management platform 906, hypervisor 920, or other operating system) of computer platform 902A may assign hardware resources of platform logic 910 to perform workloads in accordance with the stress information. In some embodiments, self-diagnostic capabilities may be combined with the stress monitoring to more accurately determine the health of the hardware resources. Each platform 902 may include platform logic 910. Platform logic 910 comprises, among other logic enabling the functionality of platform 902, one or more CPUs 912, memory 914, one or more chipsets 916, and communication interfaces 928. Although three platforms are illustrated, computer platform 902A may be interconnected with any suitable number of platforms. In various embodiments, a platform 902 may reside on a circuit board that is installed in a chassis, rack, or other suitable structure that comprises multiple platforms coupled together through network 908 (which may comprise, e.g., a rack or backplane switch).

CPUs 912 may each comprise any suitable number of processor cores and supporting logic (e.g., uncores). The cores may be coupled to each other, to memory 914, to at least one chipset 916, and/or to a communication interface 918, through one or more controllers residing on CPU 912 and/or chipset 916. In particular embodiments, a CPU 912 is embodied within a socket that is permanently or removably coupled to platform 902A. Although four CPUs are shown, a platform 902 may include any suitable number of CPUs.

Memory 914 may comprise any form of volatile or nonvolatile memory including, without limitation, magnetic media (e.g., one or more tape drives), optical media, RAM, ROM, flash memory, removable media, or any other suitable local or remote memory component or components. Memory 914 may be used for short, medium, and/or long term storage by platform 902A. Memory 914 may store any suitable data or information utilized by platform logic 910, including software embedded in a computer-readable medium, and/or encoded logic incorporated in hardware or otherwise stored (e.g., firmware). Memory 914 may store data that is used by cores of CPUs 912. In some embodiments, memory 914 may also comprise storage for instructions that may be executed by the cores of CPUs 912 or other processing elements (e.g., logic resident on chipsets 916) to provide functionality associated with the manageability engine 926 or other components of platform logic 910. A platform 902 may also include one or more chipsets 916 comprising any suitable logic to support the operation of the CPUs 912. In various embodiments, chipset 916 may reside on the same die or package as a CPU 912 or on one or more different dies or packages. Each chipset may support any suitable number of CPUs 912. A chipset 916 may also include one or more controllers to couple other components of platform logic 910 (e.g., communication interface 918 or memory 914) to one or more CPUs. In the embodiment depicted, each chipset 916 also includes a manageability engine 926. Manageability engine 926 may include any suitable logic to support the operation of chipset 916. In a particular embodiment, a manageability engine 926 (which may also be referred to as an innovation engine) is capable of collecting real-time telemetry data from the chipset 916, the CPU(s) 912 and/or memory 914 managed by the chipset 916, other components of platform logic 910, and/or various connections between components of platform logic 910. In various embodiments, the telemetry data collected includes the stress information described herein.

In various embodiments, a manageability engine 926 operates as an out-of-band asynchronous compute agent which is capable of interfacing with the various elements of platform logic 910 to collect telemetry data with no or minimal disruption to running processes on CPUs 912. For example, manageability engine 926 may comprise a dedicated processing element (e.g., a processor, controller, or other logic) on chipset 916, which provides the functionality of manageability engine 926 (e.g., by executing software instructions), thus conserving processing cycles of CPUs 912 for operations associated with the workloads performed by the platform logic 910. Moreover, the dedicated logic for the manageability engine 926 may operate asynchronously with respect to the CPUs 912 and may gather at least some of the telemetry data without increasing the load on the CPUs.

A manageability engine 926 may process telemetry data it collects (specific examples of the processing of stress information will be provided herein). In various embodiments, manageability engine 926 reports the data it collects and/or the results of its processing to other elements in the computer system, such as one or more hypervisors 920 or other operating systems and/or system management software (which may run on any suitable logic such as system management platform 906). In particular embodiments, a critical event such as a core that has accumulated an excessive amount of stress may be reported prior to the normal interval for reporting telemetry data (e.g., a notification may be sent immediately upon detection).

Additionally, manageability engine 926 may include programmable code configurable to set which CPU(s) 912 a particular chipset 916 will manage and/or which telemetry data will be collected.

Chipsets 916 also each include a communication interface 928. Communication interface 928 may be used for the communication of signaling and/or data between chipset 916 and one or more I/O devices, one or more networks 908, and/or one or more devices coupled to network 908 (e.g., system management platform 906). For example, communication interface 928 may be used to send and receive network traffic such as data packets. In a particular embodiment, a communication interface 928 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 916 (e.g., manageability engine 926 or switch 930) and another device coupled to network 908. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interfaces 928 may allow communication of data (e.g., between the manageability engine 926 and the data center management platform 906) associated with management and monitoring functions performed by manageability engine 926. In various embodiments, manageability engine 926 may utilize elements (e.g., one or more NICs) of communication interfaces 928 to report the telemetry data (e.g., to system management platform 906) in order to reserve usage of NICs of communication interface 918 for operations associated with workloads performed by platform logic 910.

Switches 930 may couple to various ports (e.g., provided by NICs) of communication interface 928 and may switch data between these ports and various components of chipset 916 (e.g., one or more Peripheral Component Interconnect Express (PCIe) lanes coupled to CPUs 912). Switches 930 may be a physical or virtual (i.e., software) switch.

Platform logic 910 may include an additional communication interface 918. Similar to communication interfaces 928, communication interfaces 918 may be used for the communication of signaling and/or data between platform logic 910 and one or more networks 908 and one or more devices coupled to the network 908. For example, communication interface 918 may be used to send and receive network traffic such as data packets. In a particular embodiment, communication interfaces 918 comprise one or more physical NICs. These NICs may enable communication between any suitable element of platform logic 910 (e.g., CPUs 912 or memory 914) and another device coupled to network 908 (e.g., elements of other platforms or remote computing devices coupled to network 908 through one or more networks).

Platform logic 910 may receive and perform any suitable types of workloads. A workload may include any request to utilize one or more resources of platform logic 910, such as one or more cores or associated logic. For example, a workload may comprise a request to instantiate a software component, such as an I/O device driver 924 or guest system 922; a request to process a network packet received from a virtual machine 932 or device external to platform 902A (such as a network node coupled to network 908); a request to execute a process or thread associated with a guest system 922, an application running on platform 902A, a hypervisor 920 or other operating system running on platform 902A; or other suitable processing request.

A virtual machine 932 may emulate a computer system with its own dedicated hardware. A virtual machine 932 may run a guest operating system on top of the hypervisor 920. The components of platform logic 910 (e.g., CPUs 912, memory 914, chipset 916, and communication interface 918) may be virtualized such that it appears to the guest operating system that the virtual machine 932 has its own dedicated components.

A virtual machine 932 may include a virtualized NIC (vNIC), which is used by the virtual machine as its network interface. A vNIC may be assigned a media access control (MAC) address or other identifier, thus allowing multiple virtual machines 932 to be individually addressable in a network.

VNF 934 may comprise a software implementation of a functional building block with defined interfaces and behavior that can be deployed in a virtualized infrastructure. In particular embodiments, a VNF 934 may include one or more virtual machines 932 that collectively provide specific functionalities (e.g., WAN optimization, VPN termination, firewall operations, load-balancing operations, security functions, etc.). A VNF 934 running on platform logic 910 may provide the same functionality as traditional network components implemented through dedicated hardware. For example, a VNF 934 may include components to perform any suitable NFV workloads, such as virtualized evolved packet core (vEPC) components, mobility management entities (MMEs), 3rd Generation Partnership Project (3GPP) control and data plane components, etc.

SFC 936 is a group of VNFs 934 organized as a chain to perform a series of operations, such as network packet processing operations. Service function chaining may provide the ability to define an ordered list of network services (e.g., firewalls and load balancers) that are stitched together in the network to create a service chain.

A hypervisor 920 (also known as a virtual machine monitor) may comprise logic to create and run guest systems 922. The hypervisor 920 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 910. Services of hypervisor 920 may be provided by virtualizing in software or through hardware assisted resources that require minimal software intervention, or both. Multiple instances of a variety of guest operating systems may be managed by the hypervisor 920. Each platform 902 may have a separate instantiation of a hypervisor 920.

Hypervisor 920 may be a native or bare-metal hypervisor that runs directly on platform logic 910 to control the platform logic and manage the guest operating systems. Alternatively, hypervisor 920 may be a hosted hypervisor that runs on a host operating system and abstracts the guest operating systems from the host operating system. Hypervisor 920 may include a virtual switch 938 that may provide virtual switching and/or routing functions to virtual machines of guest systems 922. The virtual switch 938 may comprise a logical switching fabric that couples the vNICs of the virtual machines 932 to each other, thus creating a virtual network through which virtual machines may communicate with each other.

Virtual switch 938 may comprise a software element that is executed using components of platform logic 910. In various embodiments, hypervisor 920 may be in communication with any suitable entity (e.g., a software defined network controller) which may cause hypervisor 920 to reconfigure the parameters of virtual switch 938 in response to changing conditions in platform 902 (e.g., the addition or deletion of virtual machines 932 or identification of optimizations that may be made to enhance performance of the platform).

Hypervisor 920 may also include resource allocation logic 944, which may include logic for determining allocation of platform resources based on the telemetry data (which may include stress information). Resource allocation logic 944 may also include logic for communicating with various components of platform logic 910 entities of platform 902A to implement such optimization, such as components of platform logic 910.

Any suitable logic may make one or more of these optimization decisions. For example, system management platform 906; resource allocation logic 944 of hypervisor 920 or other operating system; or other logic of computer platform 902A may be capable of making such decisions. In various embodiments, the system management platform 906 may receive telemetry data from and manage workload placement across multiple platforms 902. The system management platform 906 may communicate with hypervisors 920 (e.g., in an out-of-band manner) or other operating systems of the various platforms 902 to implement workload placements directed by the system management platform.

The elements of platform logic 910 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g., cache coherent) bus, a layered protocol architecture, a differential bus, or a Gunning transceiver logic (GTL) bus.

Elements of the computer platform 902A may be coupled together in any suitable manner such as through one or more networks 908. A network 908 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including a CPU package. An SoC represents an integrated circuit (IC) that integrates components of a computer or other electronic system into a single chip. Thus, for example, client devices 710 or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Note also that in certain embodiments, some of the components may be omitted or consolidated. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 810, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, an FPGA, an erasable programmable read-only memory (EPROM), an electrically erasable programmable read-only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 850 may store information in any suitable type of tangible, non-transitory storage medium (for example, RAM, ROM, FPGA, EPROM, electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 820 and storage 850, should be construed as being encompassed within the broad terms 'memory' and 'storage,' as appropriate. A non-transitory storage medium herein is expressly intended to include any non-transitory, special-purpose or programmable hardware configured to provide the disclosed operations, or to cause a processor such as processor 810 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as standalone modules (e.g., a device with associated components and circuitry configured to perform a specific application or function) or implemented as plug-in modules into application-specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated or sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

Example Implementations

There is disclosed in one example a computing apparatus, comprising: a hardware platform; and a storage medium having stored thereon executable instructions to provide an inference engine configured to: receive a new suspicious fragment object from a protected device; add the new suspicious fragment object to a rolling map configured to provide a temporal snapshot of suspicious fragment objects over a time span; determine a connection between the new suspicious fragment object and an existing suspicious fragment object within the rolling map; apply the connection to a connection map; and operate a map classifier to determine that the connection map represents a probable computer security threat.

There is further disclosed an example of a computing apparatus, wherein the time span is one hour.

There is further disclosed an example of a computing apparatus, wherein determining that the connection map represents a probable computer security threat comprises static analysis of content and metadata of the new suspicious fragment compared to the existing suspicious fragment object.

There is further disclosed an example of a computing apparatus, wherein determining that the connection map represents a probable computer security threat comprises applying a probability function based on a probability function trained from known threat samples.

There is further disclosed an example of a computing apparatus, wherein determining the connection comprises identifying a verified connection between the new suspicious fragment object and the existing suspicious fragment object.

There is further disclosed an example of a computing apparatus, wherein determining the connection comprises identified a weak connection between the new suspicious fragment object and the existing suspicious fragment object.

There is further disclosed an example of a computing apparatus, wherein the inference engine further comprises a fragment predictor to predict a fragment to occur on the protected device, and to provide a message to the protected device to search for the predicted fragment.

There is further disclosed an example of a computing apparatus, wherein the new suspicious fragment is selected from the group consisting of a windows management instrumentation (WMI) entry, a registry entry, an environment variable, a cookie, a macro, a shortcut, a link, and a scheduled task.

There is also disclosed an example of one or more tangible, non-transitory computer-readable storage mediums having stored thereon executable instructions to provide an inference engine configured to: receive a new suspicious fragment object from a client device; add the new suspicious fragment object to a rolling map configured to provide a snapshot of suspicious fragment objects over a time span; identify a probable connection between the new suspicious fragment object and an existing suspicious fragment object within the rolling map; apply the connection to a connection map; and determine that the connection map represents a probable computer security threat.

There is further disclosed an example of one or more tangible, non-transitory computer-readable mediums, wherein the time span is one hour.

There is further disclosed an example of one or more tangible, non-transitory computer-readable mediums, wherein determining that the connection map represents a probable computer security threat comprises static analysis of content and metadata of the new suspicious fragment compared to the existing suspicious fragment object.

There is further disclosed an example of one or more tangible, non-transitory computer-readable mediums, wherein determining that the connection map represents a probable computer security threat comprises applying a probability function based on a probability function trained from known threat samples.

There is further disclosed an example of one or more tangible, non-transitory computer-readable mediums, wherein determining the connection comprises identifying a verified connection between the new suspicious fragment object and the existing suspicious fragment object.

There is further disclosed an example of one or more tangible, non-transitory computer-readable mediums, wherein determining the connection comprises identified a weak connection between the new suspicious fragment object and the existing suspicious fragment object.

There is further disclosed an example of one or more tangible, non-transitory computer-readable mediums, wherein the inference engine further comprises a fragment predictor to predict a fragment to occur on the protected device, and to provide a message to the protected device to search for the predicted fragment.

There is further disclosed an example of one or more tangible, non-transitory computer-readable mediums, wherein the new suspicious fragment is selected from the group consisting of a WMI entry, a registry entry, an environment variable, a cookie, a macro, a shortcut, a link, and a scheduled task.

There is also disclosed an example of a computer-implemented method of securing a device against a living off the land attack, comprising: receiving a new suspicious fragment object from a client device; adding the new suspicious fragment object to a rolling map configured to provide a snapshot of suspicious fragment objects over a time span; identifying a probable connection between the new suspicious fragment object and an existing suspicious fragment object within the rolling map; applying the connection to a connection map; and determining that the connection map represents a probable computer security threat.

There is further disclosed an example of the computer-implemented method of securing a device against a living off the land attack, wherein the time span is one hour.

There is further disclosed an example of the computer-implemented method of securing a device against a living off the land attack, wherein determining that the connection map represents a probable computer security threat comprises static analysis of content and metadata of the new suspicious fragment compared to the existing suspicious fragment object.

There is further disclosed an example of the computer-implemented method of securing a device against a living off the land attack, wherein determining that the connection map represents a probable computer security threat comprises applying a probability function based on a probability function trained from known threat samples.

There is further disclosed an example of the computer-implemented method of securing a device against a living off the land attack, wherein determining the connection comprises identifying a verified connection between the new suspicious fragment object and the existing suspicious fragment object.

There is further disclosed an example of the computer-implemented method of securing a device against a living off the land attack, wherein determining the connection comprises identified a weak connection between the new suspicious fragment object and the existing suspicious fragment object.

There is further disclosed an example of the computer-implemented method of securing a device against a living off the land attack, wherein the inference engine further comprises a fragment predictor to predict a fragment to occur on the protected device, and to provide a message to the protected device to search for the predicted fragment.

There is further disclosed an example of the computer-implemented method of securing a device against a living off the land attack, wherein the new suspicious fragment is selected from the group consisting of a WMI entry, a registry entry, an environment variable, a cookie, a macro, a shortcut, a link, and a scheduled task.

There is further disclosed an example of an apparatus, comprising means for performing the computer-implemented method of securing a device against a living off the land attack.

There is further disclosed an example of an apparatus, wherein the means for performing the computer-implemented method of securing a device against a living off the land attack comprise a processor and a memory.

There is further disclosed an example of an apparatus, wherein the memory comprises machine-readable instructions, that when executed cause the apparatus to perform the computer-implemented method of securing a device against a living off the land attack.

There is further disclosed an example of an apparatus, wherein the apparatus is a computing system.

There is further disclosed an example of at least one computer-readable medium comprising instructions that, when executed, implement the computer-implemented method of securing a device against a living off the land attack, or realize an apparatus as disclosed in one or more of the prior examples.

There is also disclosed an example of a computing device, comprising: a hardware platform; a storage medium having encoded thereon instructions to provide a threat detection engine comprising: a plurality of harvesters to harvest new or updated objects from a plurality of persistent system elements; an extractor to extract potential code fragments from the new or updated objects; and a fragment classifier to identify a fragment as suspicious; and an interface to provide the suspicious fragment to an inference engine.

There is further disclosed an example of the computing device, wherein the interface is an application programming interface (API) to a local inference engine.

There is further disclosed an example of the computing device, wherein the interface is a network interface to a remote inference engine.

There is further disclosed an example of the computing device, wherein the detection engine is further configured to receive a notification from the inference engine that the suspicious fragment is a fragment of a fileless threat, and to take a remedial action.

There is further disclosed an example of the computing device, wherein the detection engine further comprises a generic feature extractor to perform a broad prefilter action.

There is further disclosed an example of the computing device, wherein the detection engine further comprises a generic filter to exclude non-suspicious fragments.

There is further disclosed an example of the computing device, wherein the detection engine further comprises a prefilter harvester to: receive from the inference engine a predicted fragment of a fileless threat; find the predicted fragment; and provide the predicted fragment to the inference engine.

There is further disclosed an example of the computing device, wherein the detection engine further comprises an early inspection module to apply machine learning classifiers to an object pre-filtered based on a broad filtering criterion.

There is also disclosed an example of one or more tangible, non-transitory computer-readable storage mediums having stored thereon executable instructions to: harvest new or updated objects from a plurality of persistent system elements; extract potential code fragments from the new or updated objects; and identify a fragment as suspicious; and provide the suspicious fragment to an inference engine.

There is further disclosed an example of the one or more tangible, non-transitory computer-readable mediums, wherein the interface is an application programming interface (API) to a local inference engine.

There is further disclosed an example of the one or more tangible, non-transitory computer-readable mediums, wherein the interface is a network interface to a remote inference engine.

There is further disclosed an example of the one or more tangible, non-transitory computer-readable mediums, wherein the instructions are further to receive a notification from the inference engine that the suspicious fragment is a fragment of a fileless threat, and to take a remedial action.

There is further disclosed an example of the one or more tangible, non-transitory computer-readable mediums, wherein the instructions are further to perform a broad prefilter action.

There is further disclosed an example of the one or more tangible, non-transitory computer-readable mediums, wherein the instructions are further to exclude non-suspicious fragments.

There is further disclosed an example of the one or more tangible, non-transitory computer-readable mediums, wherein the instructions are further to: receive from the inference engine a predicted fragment of a fileless threat; find the predicted fragment; and provide the predicted fragment to the inference engine.

There is further disclosed an example of the one or more tangible, non-transitory computer-readable mediums, wherein the instructions are further to apply machine learning classifiers to an object pre-filtered based on a broad filtering criterion.

There is also disclosed an example of a computer-implemented method of identifying a fileless security threat, comprising: harvesting new or updated objects from a plurality of persistent system elements; extracting potential code fragments from the new or updated objects; and identifying a fragment as suspicious; and providing the suspicious fragment to an inference engine.

There is further disclosed an example of the computer-implemented method of identifying a fileless security threat, wherein the interface is an application programming interface (API) to a local inference engine.

There is further disclosed an example of the computer-implemented method of identifying a fileless security threat, wherein the interface is a network interface to a remote inference engine.

There is further disclosed an example of the computer-implemented method of identifying a fileless security threat, further comprising receiving a notification from the inference engine that the suspicious fragment is a fragment of a fileless threat, and to take a remedial action.

There is further disclosed an example of the computer-implemented method of identifying a fileless security threat, further comprising performing a broad prefilter action.

There is further disclosed an example of the computer-implemented method of identifying a fileless security threat, further comprising excluding non-suspicious fragments.

There is further disclosed an example of the computer-implemented method of identifying a fileless security threat, further comprising: receiving from the inference engine a predicted fragment of a fileless threat; finding the predicted fragment; and providing the predicted fragment to the inference engine.

There is further disclosed an example of the computer-implemented method of identifying a fileless security threat, further comprising applying machine learning classifiers to an object pre-filtered based on a broad filtering criterion.

There is further disclosed an example of an apparatus comprising means for performing the method of one or more of the disclosed examples.

There is further disclosed an example of an apparatus, wherein the means for performing the method of one or more of the disclosed examples comprise a processor and a memory.

There is further disclosed an example of an apparatus, wherein the memory comprises machine-readable instructions, that when executed cause the apparatus to perform the method of one or more of the disclosed examples.

There is further disclosed an example of an apparatus to perform the method of one or more of the disclosed examples, wherein the apparatus is a computing system.

There is further disclosed an example of at least one computer-readable medium comprising instructions that, when executed, implement a method or realize an apparatus as disclosed in one or more of the above examples.

What is claimed is:

1. A computing apparatus, comprising:
   a hardware platform; and
   a storage medium having stored thereon executable instructions to provide a threat detection engine configured to:
   identify two or more suspicious fragment objects, wherein at least two of the two or more identified suspicious fragment objects are each located in a different location of a device, wherein the different locations include two or more of a windows management instrumentation (WMI) entry, a registry hive, an environment variable, a link, a shortcut, a macro, a scheduled task, and a cookie;
   store the two or more identified suspicious fragments objects;
   add the two or more stored identified suspicious fragments objects to a rolling map to provide a temporal snapshot of suspicious fragment objects over a time span;
   determine a connection between the two or more stored identified suspicious fragments objects within the rolling map by analyzing data in each of the two or more stored identified suspicious fragment objects and metadata associated with each of the two or more stored identified suspicious fragment objects to determine previous and possible future connections;
   determine if the two or more stored identified suspicious fragment objects represent a probable computer security threat;
   predict a fragment object to occur on the device at an additional location different than the locations of the two or more identified suspicious fragment objects; and
   provide a message to the device to search for the predicted fragment object at the additional location.

2. The computing apparatus of claim 1, wherein the time span is one hour.

3. The computing apparatus of claim 1, wherein determining that the two or more stored identified suspicious fragment objects represent the probable computer security threat comprises linking the two or more stored identified suspicious fragment objects based on data in each of the two or more stored identified suspicious fragment objects and metadata associated with each of the two or more stored identified suspicious fragment objects.

4. The computing apparatus of claim 1, wherein determining the connection includes identifying a verified connection between the two or more stored identified suspicious fragment objects.

5. One or more tangible, non-transitory computer-readable storage mediums having stored thereon executable instructions to provide an inference engine configured to:
   receive, over a network connection, a new suspicious fragment object from a client device;
   add the new suspicious fragment object to a rolling map to provide a snapshot of suspicious fragment objects over a time span;
   identify a probable connection between the new suspicious fragment object and an existing suspicious fragment object within the rolling map by analyzing data in each of the new suspicious fragment object and the existing suspicious fragment object and metadata associated with each of the new suspicious fragment object and the existing suspicious fragment object to determine previous and possible future connections;
   determine that the identified probable connection between the new suspicious fragment object and the existing suspicious fragment object represents a probable computer security threat, wherein the new suspicious fragment object and the existing suspicious fragment object are each located in a different location of the client device, wherein the different locations include two or more of a windows management instrumentation (WMI) entry, a registry hive, an environment variable, a link, a shortcut, a macro, a scheduled task, and a cookie;
   predict a fragment object to occur on the device at an additional location different than the locations of the new suspicious fragment object and existing suspicious fragment object; and
   provide a message to the client device to search for the predicted fragment object at the additional location.

6. The one or more tangible, non-transitory computer-readable mediums of claim 5, wherein the time span is one hour.

7. The one or more tangible, non-transitory computer-readable mediums of claim 5, wherein determining that the identified probable connection between the new suspicious fragment object and the existing suspicious fragment object represents the probable computer security threat comprises linking the new suspicious fragment object and the existing suspicious fragment object based on data in each of the new suspicious fragment object and the existing suspicious fragment object and metadata associated with each of the new suspicious fragment object and the existing suspicious fragment object.

8. The one or more tangible, non-transitory computer-readable mediums of claim 5, wherein determining that the identified probable connection between the new suspicious fragment object and the existing suspicious fragment object represents the probable computer security threat comprises identifying a verified connection between the new suspicious fragment object and the existing suspicious fragment object.

9. A computer-implemented method of securing a device against a living-off-the-land attack, comprising:
   receiving a new suspicious fragment object from a client device;
   adding the new suspicious fragment object to a rolling map to provide a snapshot of suspicious fragment objects over a time span;
   identifying a probable connection between the new suspicious fragment object and an existing suspicious fragment object within the rolling map by analyzing data in each of the new suspicious fragment object and the existing suspicious fragment object and metadata associated with each of the new suspicious fragment object and the existing suspicious fragment object to determine previous and possible future connections;
   determining that the probable connection between the new suspicious fragment object and the existing suspicious fragment object represents a probable computer security threat, wherein the new suspicious fragment object and the existing suspicious fragment object are each located in a different location of the client device, wherein the different locations include two or more of a windows management instrumentation (WMI) entry, a registry hive, an environment variable, a link, a shortcut, a macro, a scheduled task, and a cookie;

predicting a fragment object to occur on the client device at an additional location different than the locations of the new suspicious fragment object and the existing suspicious fragment object; and providing a message to the client device to instruct the client device to search for the predicted fragment object at the additional location.

10. The method of claim 9, wherein the time span is one hour.

11. The method of claim 9, wherein determining that the identified probable connection between the new suspicious fragment object and the existing suspicious fragment object represents the probable computer security threat comprises linking the new suspicious fragment object and the existing suspicious fragment object based on data in each of the new suspicious fragment object and the existing suspicious fragment object and metadata associated with each of the new suspicious fragment object and the existing suspicious fragment object.

12. The computing apparatus of claim 1, further comprising:

based on the two or more identified suspicious fragments objects, determine one or more fragment objects that are part of the probable computer security threat but have not been identified as being located on the device; and search the device for the determined two or more identified suspicious fragment objects.

13. The computing apparatus of claim 1, further comprising:

communicating the two or more stored identified suspicious fragment objects to a network element, wherein the network element receives a plurality of suspicious fragment objects from a plurality of devices and aggregates the plurality of suspicious fragment objects to determine if the two or more stored identified suspicious fragment objects represent the probable computer security threat.

14. The computing apparatus of claim 13, wherein the two or more stored identified suspicious fragment objects do not represent the probable computer security threat by themselves but do represent the probable computer security threat when aggregated with the plurality of suspicious fragment objects from the plurality of devices.

15. The one or more tangible, non-transitory computer-readable mediums of claim 5, comprising executable instructions to further provide an inference engine configured to:

receive a plurality of suspicious fragment objects from a plurality of devices; and aggregate the plurality of suspicious fragment objects to determine if the new suspicious fragment object and the existing suspicious fragment object represent the probable computer security threat.

16. The one or more tangible, non-transitory computer-readable mediums of claim 15, wherein the new suspicious fragment object and the existing suspicious fragment object do not represent the probable computer security threat by themselves but do represent the probable computer security threat when aggregated with the plurality of suspicious fragment objects from the plurality of devices.

17. The method of claim 9, further comprising:

receiving a plurality of suspicious fragment objects from a plurality of devices; and aggregating the plurality of suspicious fragment objects to determine if the new suspicious fragment object and the existing suspicious fragment object represent the probable computer security threat.

18. The method of claim 17, wherein the new suspicious fragment object and the existing suspicious fragment object do not represent the probable computer security threat by themselves but do represent the probable computer security threat when aggregated with the plurality of suspicious fragment objects from the plurality of devices.

\* \* \* \* \*